(12) United States Patent
Saori

(10) Patent No.: US 8,908,298 B2
(45) Date of Patent: Dec. 9, 2014

(54) ZOOM LENS SYSTEM AND ELECTRONIC IMAGING APPARATUS USING THE SAME

(71) Applicant: Pentax Ricoh Imaging Company, Ltd., Tokyo (JP)

(72) Inventor: Masakazu Saori, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 34 days.

(21) Appl. No.: 13/827,391

(22) Filed: Mar. 14, 2013

(65) Prior Publication Data

US 2013/0258494 A1 Oct. 3, 2013

(30) Foreign Application Priority Data

Mar. 28, 2012 (JP) ................................. 2012-072796

(51) Int. Cl.
*G02B 9/12* (2006.01)
*G02B 15/14* (2006.01)
*G02B 15/173* (2006.01)

(52) U.S. Cl.
CPC .............. *G02B 15/14* (2013.01); *G02B 15/173* (2013.01)
USPC ....................................................... 359/787

(58) Field of Classification Search
CPC ............... G02B 9/12; G02B 9/14; G02B 9/22
USPC .................................. 359/690, 785, 787, 788
See application file for complete search history.

(56) References Cited

U.S. PATENT DOCUMENTS

| 6,236,516 | B1 * | 5/2001 | Misaka ........................ 359/690 |
| 2010/0195207 | A1 | 8/2010 | Uchida et al. |

FOREIGN PATENT DOCUMENTS

| JP | 2000-028923 | 1/2000 |
| JP | 2010-175954 | 8/2010 |

* cited by examiner

*Primary Examiner* — Joseph P Martinez
(74) *Attorney, Agent, or Firm* — Greenblum & Bernstein, P.L.C.

(57) ABSTRACT

A zoom lens system includes a positive first lens group, a negative second lens group, and a positive rearward-remaining lens group. Upon zooming from the short to long focal length extremities, the distance between the first and second lens groups increases, the distance between the second and rearward-remaining lens groups decreases, and at least the first lens group and at least part of the rearward-remaining lens group moves. The second lens group includes a negative first sub-lens group which does not move during a focusing operation, and a negative second sub-lens group which moves in the optical axis direction during a focusing operation. The positive rearward-remaining lens group includes at least two lens groups, the distance therebetween mutually changing during zooming from the short focal length extremity to the long focal length extremity.

17 Claims, 27 Drawing Sheets

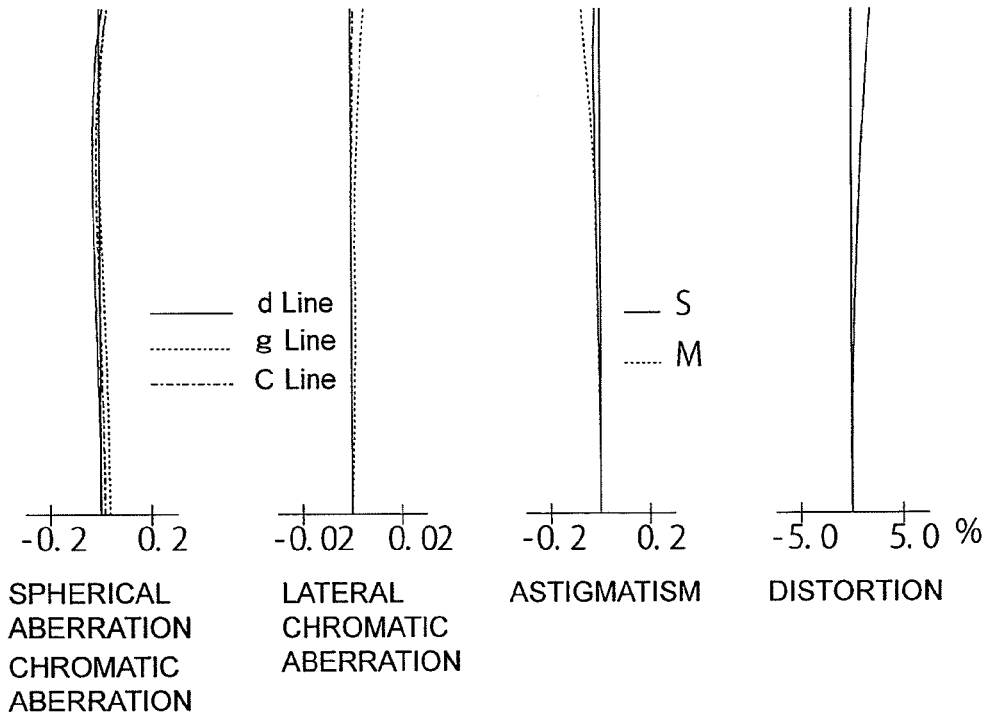
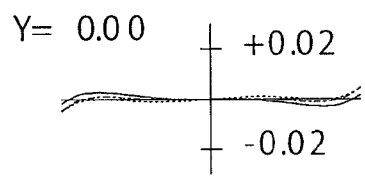
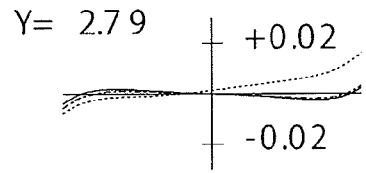
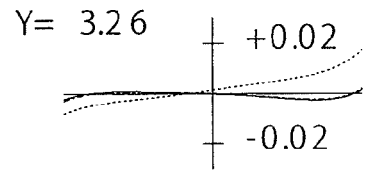
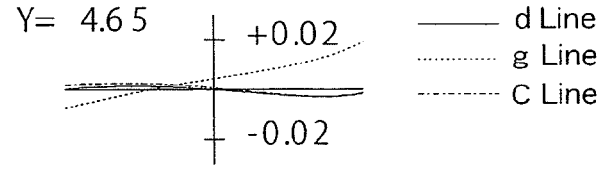

SPHERICAL ABERRATION CHROMATIC ABERRATION    LATERAL CHROMATIC ABERRATION    ASTIGMATISM    DISTORTION

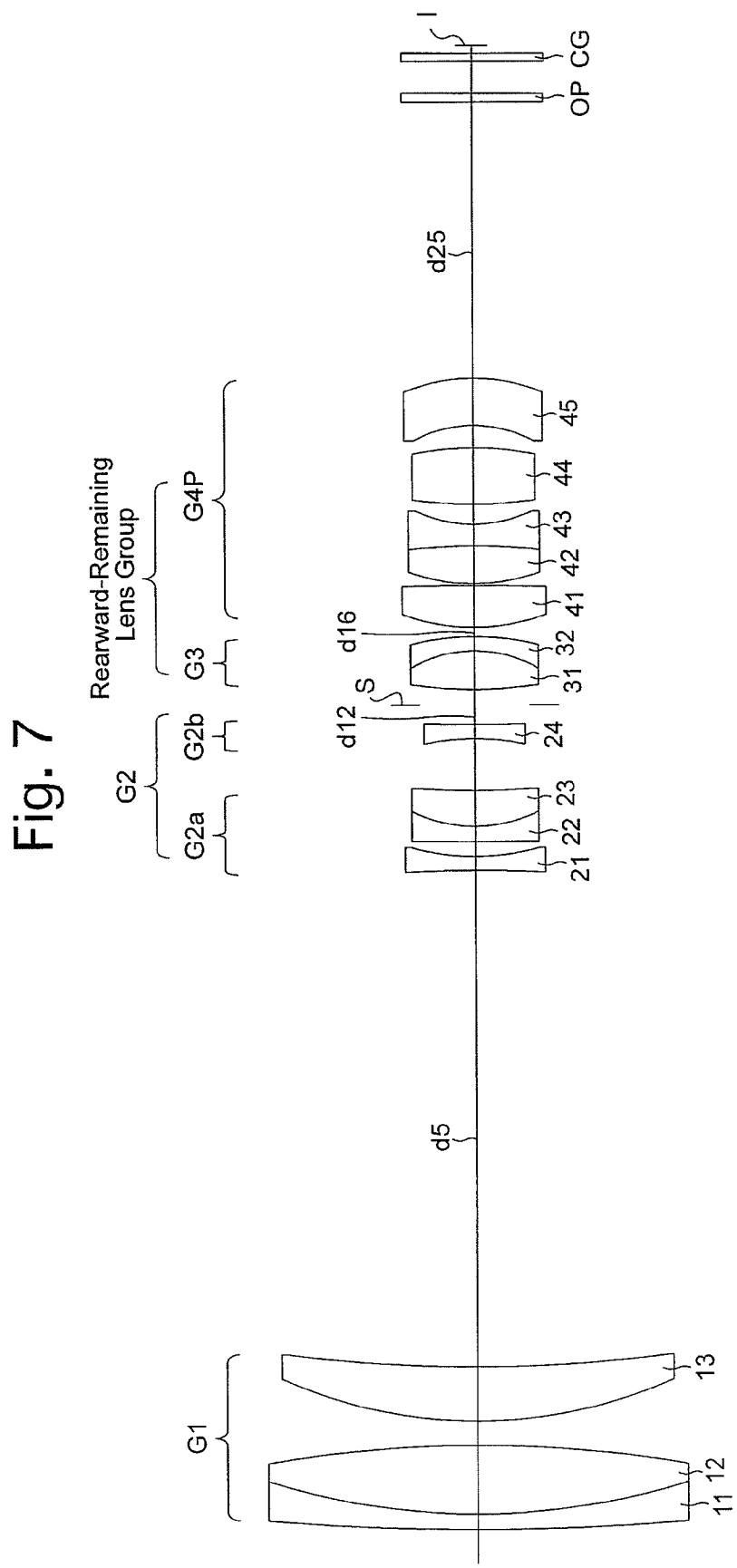

SPHERICAL ABERRATION CHROMATIC ABERRATION | LATERAL CHROMATIC ABERRATION | ASTIGMATISM | DISTORTION

Fig. 14A  Fig. 14B  Fig. 14C  Fig. 14D
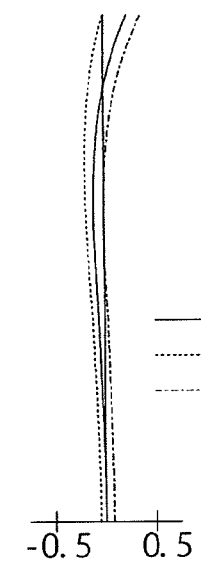
FNO.=1:6.1
— d Line
····· g Line
--- C Line
-0.5  0.5
SPHERICAL
ABERRATION
CHROMATIC
ABERRATION
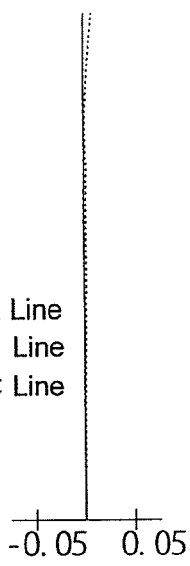
Y=14.2
-0.05  0.05
LATERAL
CHROMATIC
ABERRATION
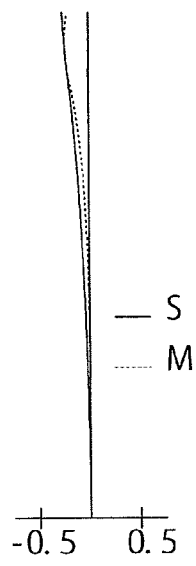
Y=14.2
— S
--- M
-0.5  0.5
ASTIGMATISM
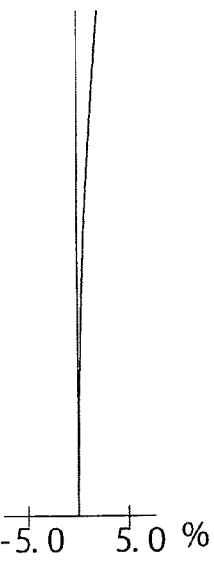
Y=14.2
-5.0  5.0 %
DISTORTION
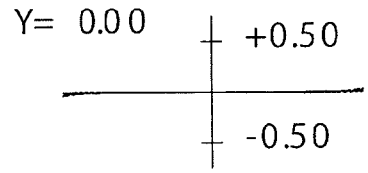
Fig. 15A   Y= 0.00
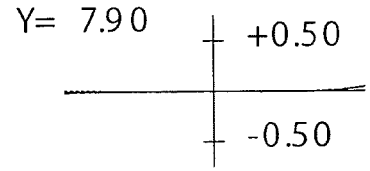
Fig. 15B   Y= 7.90
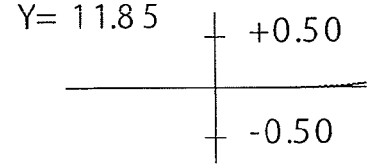
Fig. 15C   Y= 11.85
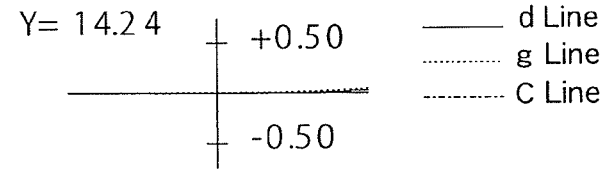
Fig. 15D   Y= 14.24
— d Line
····· g Line
--- C Line Fig. 17A  Fig. 17B  Fig. 17C  Fig. 17D
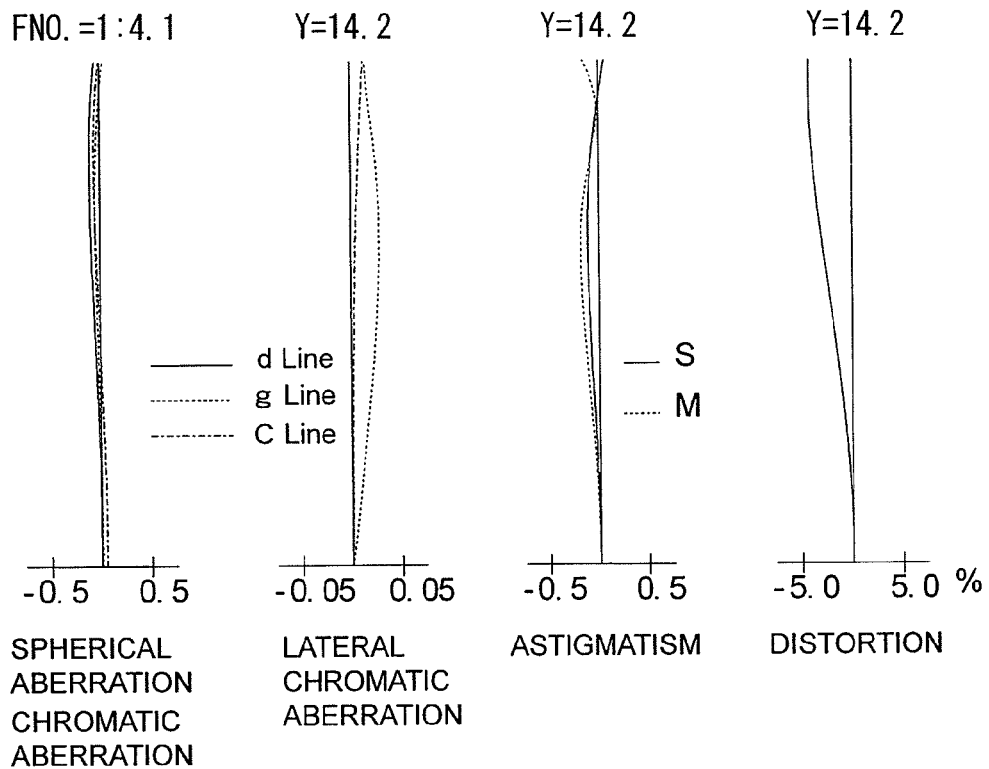
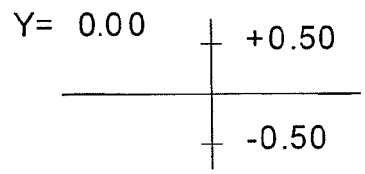
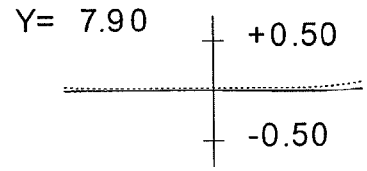
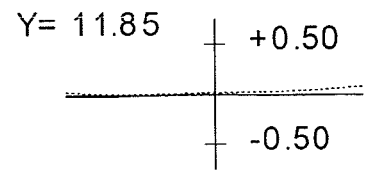
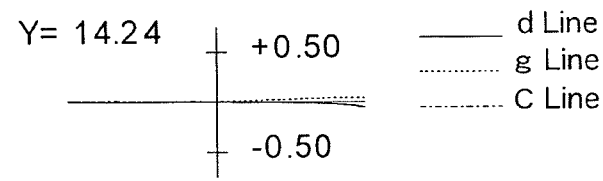

SPHERICAL ABERRATION CHROMATIC ABERRATION

LATERAL CHROMATIC ABERRATION

ASTIGMATISM

DISTORTION

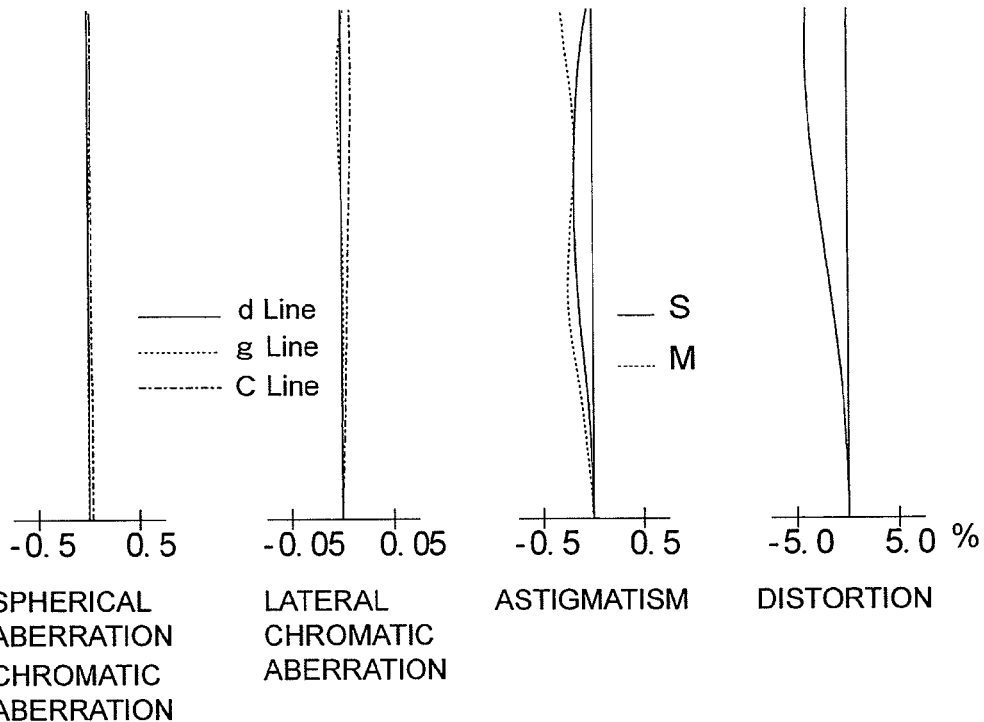
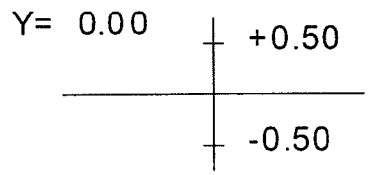
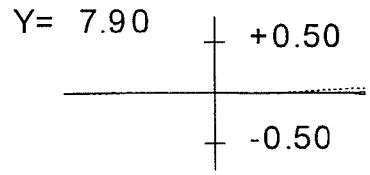
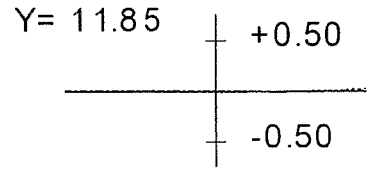
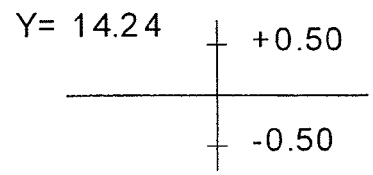

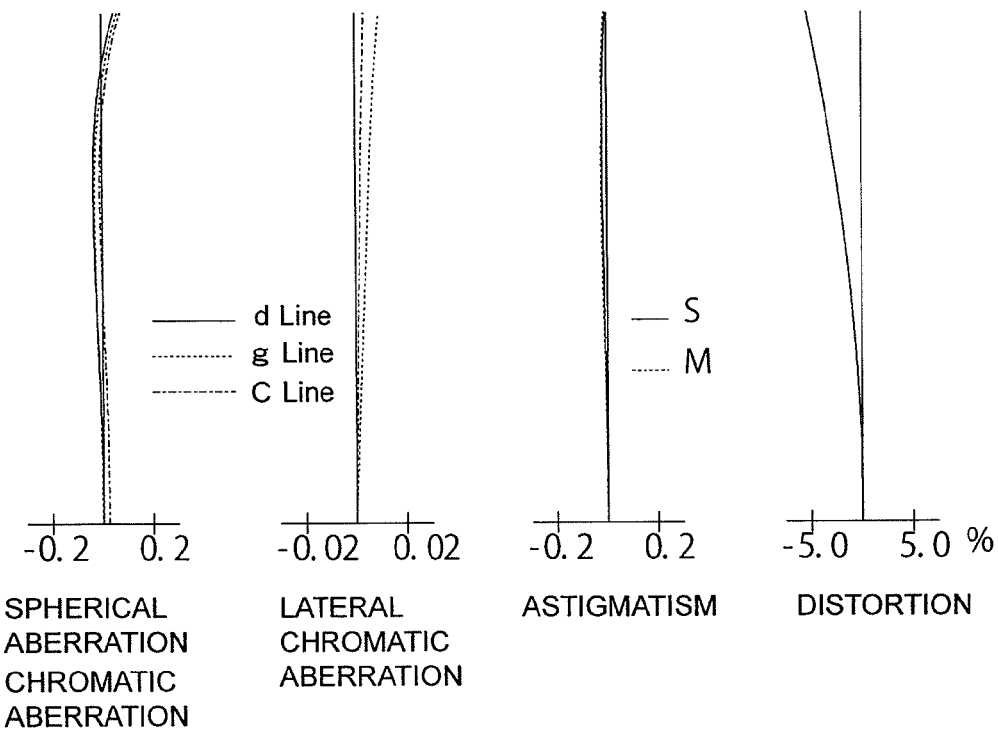
Fig. 35A  Fig. 35B  Fig. 35C  Fig. 35D
FNO.=1:2.8   Y=4.65   Y=4.65   Y=4.65
-0.2  0.2    -0.02  0.02    -0.2  0.2    -5.0  5.0 %
SPHERICAL ABERRATION CHROMATIC ABERRATION    LATERAL CHROMATIC ABERRATION    ASTIGMATISM    DISTORTION
Fig. 36A  Y=0.00
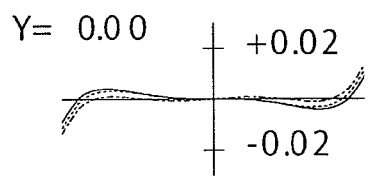
Fig. 36B  Y=2.79
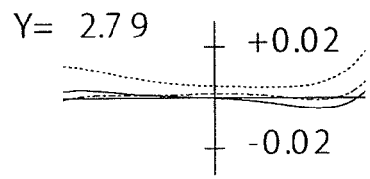
Fig. 36C  Y=3.26
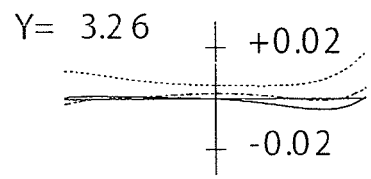
Fig. 36D  Y=4.65
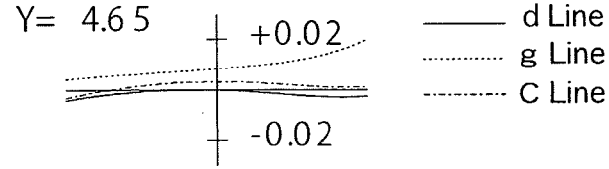

ZOOM LENS SYSTEM AND ELECTRONIC IMAGING APPARATUS USING THE SAME

BACKGROUND OF THE INVENTION

1. Field of the Invention

The present invention relates to a zoom lens system and an electronic imaging apparatus using such a zoom lens system.

2. Description of Related Art

In recent years there has been an increasing demand for a zoom lens system in an electronic imaging apparatus, such as a digital camera, etc., to be more compact (miniaturized) and to have higher optical performance. Furthermore, there has been an increasing demand to reduce the size (miniaturize) and weight of the focusing lens group to carry out a rapid and quiet focusing operation, in order to carry out a desirable movie shooting (video recording) operation. Furthermore, there is also an demand for the field curvature that occurs during a zooming operation to be to favorably corrected.

Japanese Unexamined Patent Publication Nos. 2000-28923 and 2010-175954 disclose a zoom lens system configured of a positive first lens group, a negative second lens group, and a positive rearward-remaining lens group, in that order from the object side, in which the second lens group is divided into a negative front sub-lens group and a negative rear sub-lens group, and the negative rear sub-lens group constitutes a focusing lens group that is moved in the optical axis direction when carrying out a focusing operation.

However, in the zoom lens system taught in above-mentioned Japanese Unexamined Patent Publication No. 2000-28923, since the rear sub-lens group of the second lens group (the rear sub-lens group L2b in Japanese Unexamined Patent Publication No. 2000-28923), which constitutes a focusing lens group, is configured of two negative lens elements and one positive lens element, i.e., three lens elements, miniaturization and reduction in weight of the focusing lens group is insufficient, so that a rapid and quiet focusing operation cannot be carried out.

Furthermore, in the zoom lens system taught in above-mentioned Japanese Unexamined Patent Publication No. 2010-175954, since the lens group provided behind the second lens group (the "third lens group G3" in Japanese Unexamined Patent Publication No. 2010-175954), which constitutes a focusing lens group, is configured of a single lens element, there is no problem in regard to the reduction in size and weight of the focusing lens group, however, since the lens group (third lens group) provided behind the second lens group also serves as a compensation lens group that compensates for the image-plane position during zooming, fluctuation in field curvature occurs during zooming.

SUMMARY OF THE INVENTION

The present invention has been devised with consideration to the above problems, and provides a zoom lens system having a miniaturized and reduced-in-weight focusing lens group that can carry out a rapid and quiet focusing operation while achieving a superior optical quality by favorably correcting field curvature occurring during a zooming operation, and an electronic imaging apparatus using such a zoom lens system.

According to an aspect of the present invention, a zoom lens system is provided, including a positive first lens group, a negative second lens group, and a positive rearward-remaining lens group, in that order from the object side, wherein upon zooming from the short focal length extremity to the long focal length extremity, the distance between the first lens group and the second lens group increases, the distance between the second lens group and the rearward-remaining lens group decreases, and at least the first lens group and at least part of the rearward-remaining lens group moves in the optical axis direction of the zoom lens system. The second lens group includes a negative first sub-lens group which does not move in the optical axis direction during a focusing operation, and a negative second sub-lens group which moves in the optical axis direction during a focusing operation, in that order from the object side. The positive rearward-remaining lens group includes at least two lens groups, the distance therebetween mutually changing during zooming from the short focal length extremity to the long focal length extremity.

It is desirable for the following condition (1) to be satisfied:

$$0.1 < f2/f2b < 0.7 \tag{1},$$

wherein f2 designates the focal length of the second lens group, and f2b designates the focal length of the second sub-lens group.

It is desirable for the zoom lens system of the present invention to satisfy the following condition (1') from within the range of condition (1):

$$0.2 < f2/f2b < 0.6 \tag{1'}.$$

It is desirable for the second sub-lens group to be a single negative lens element.

It is desirable for the second sub-lens group to be a cemented lens formed from a negative lens element and a positive lens element, in that order from the object side.

It is desirable for the distance between the first sub-lens group and the second sub-lens group to remain constant during zooming from the short focal length extremity to the long focal length extremity.

It is desirable for the following condition (2) to be satisfied:

$$45 < v2bn \tag{2},$$

wherein $v2bn$ designates the Abbe number with respect to the d-line of the negative lens element of the second sub-lens group.

It is desirable for the following condition (3) to be satisfied:

$$1.55 < N2bn \tag{3},$$

wherein N2bn designates the refractive index at the d-line of the negative lens element of the second sub-lens group.

It is desirable for the following condition (4) to be satisfied:

$$0.2 < f2a/f2b < 2.0 \tag{4},$$

wherein f2a designates the focal length of the first sub-lens group, and f2b designates the focal length of the second sub-lens group.

It is desirable for the rearward-remaining lens group to include a positive third lens group, and a positive fourth lens group, in that order from the object side. In this case, the zoom lens system is configured of, in effect, four lens groups, i.e., a positive lens group (first lens group), a negative lens group (second lens group), a positive lens group (third lens group), and a positive lens group (fourth lens group).

It is desirable for the rearward-remaining lens group to include a positive third lens group, a negative fourth lens group, and a positive fifth lens group, in that order from the object side. In this case, the zoom lens system is configured of, in effect, five lens groups, i.e., a positive lens group (first lens group), a negative lens group (second lens group), a positive lens group (third lens group), a negative lens group (fourth lens group), and a positive lens group (fifth lens group).

It is desirable for the rearward-remaining lens group to include a positive third lens group, a negative fourth lens group, a positive fifth lens group, and a negative sixth lens group, in that order from the object side. In this case, the zoom lens system is configured of, in effect, six lens groups, i.e., a positive lens group (first lens group), a negative lens group (second lens group), a positive lens group (third lens group), a negative lens group (fourth lens group), a positive lens group (fifth lens group), and a negative lens group (sixth lens group).

In an embodiment, an electronic imaging apparatus is provided, including the above-described zoom lens system.

According to the present invention, a zoom lens system is provided, having a miniaturized and reduced-in-weight focusing lens group that can carry out a rapid and quiet focusing operation, while achieving a superior optical quality by favorably correcting field curvature occurring during a zooming operation, and an electronic imaging apparatus using such a zoom lens system.

The present disclosure relates to subject matter contained in Japanese Patent Application No. 2012-072796 (filed on Mar. 28, 2012) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1;

FIGS. 3A, 3B, 3C and 3D show various lateral aberrations that occurred in the lens arrangement shown in FIG. 1;

FIG. 7 shows a lens arrangement of a second numerical embodiment of a zoom lens system, according to the present invention, at the long focal length extremity when focused on an object at infinity;

FIGS. 9A, 9B, 9C and 9D show various lateral aberrations that occurred in the lens arrangement shown in FIG. 7;

FIGS. 14A, 14B, 14C and 14D show various aberrations that occurred in the lens arrangement shown in FIG. 13;

FIGS. 15A, 15B, 15C and 15D show various lateral aberrations that occurred in the lens arrangement shown in FIG. 13;

FIGS. 17A, 17B, 17C and 17D show various aberrations that occurred in the lens arrangement shown in FIG. 16;

FIGS. 18A, 18B, 18C and 18D show various lateral aberrations that occurred in the lens arrangement shown in FIG. 16;

FIGS. 23A, 23B, 23C and 23D show various aberrations that occurred in the lens arrangement shown in FIG. 22;

FIGS. 24A, 24B, 24C and 24D show various lateral aberrations that occurred in the lens arrangement shown in FIG. 22;

FIGS. 35A, 35B, 35C and 35D show various aberrations that occurred in the lens arrangement shown in FIG. 34;

FIGS. 36A, 36B, 36C and 36D show various lateral aberrations that occurred in the lens arrangement shown in FIG. 34;

DESCRIPTION OF THE EMBODIMENTS

Figure 37:
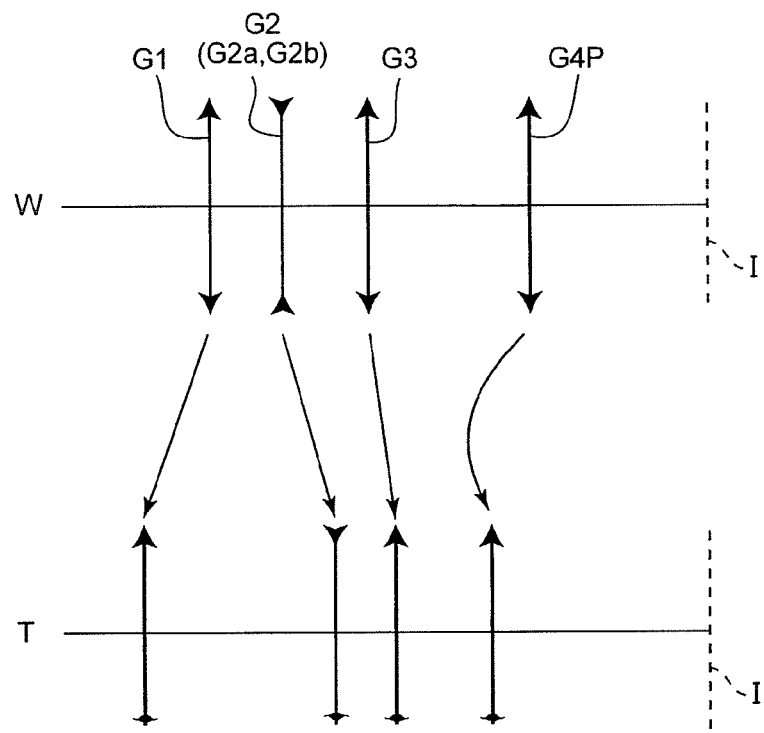
FIG. 37 shows a first zoom path of the zoom lens system according to the present invention.
Figure 38:
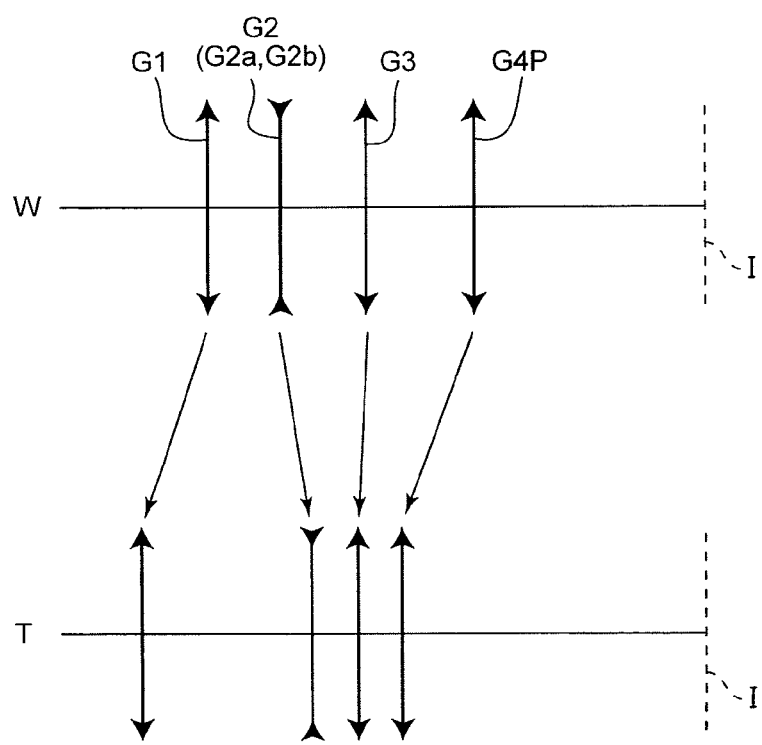
FIG. 38 shows a second zoom path of the zoom lens system according to the present invention.
Figure 39:
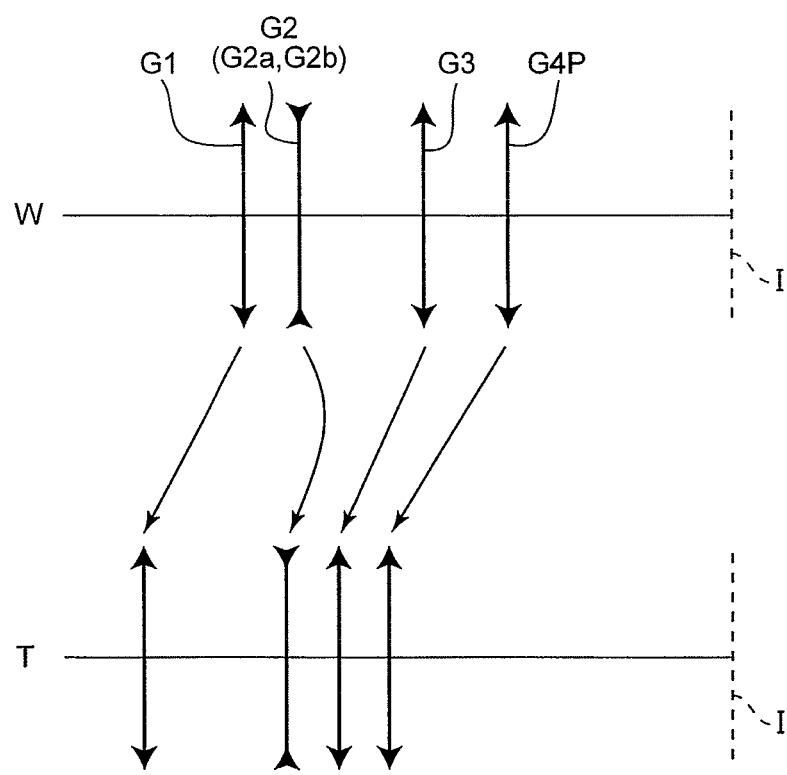
FIG. 39 shows a third zoom path of the zoom lens system according to the present invention.

The zoom lens system of the first through third numerical embodiments and the sixth numerical embodiment, as shown in the lens arrangements of FIGS. 1, 4, 7, 10, 13, 16, 31 and 34, and in the zoom paths of FIGS. 37 through 39, is configured of a positive first lens group G1, a negative second lens group G2, a positive third lens group (rearward-remaining lens group) G3, and a positive fourth lens group (rearward-remaining lens group) G4P, in that order from the object side. The second lens group G2 is configured of a negative first sub-lens group G2a, and a negative second sub-lens group G2b, in that order from the object side. 'I' designates the imaging plane.

Upon zooming from the short focal length extremity to the long focal length extremity, the distance between the first sub-lens group G2a and the second sub-lens group G2b does not change (the first sub-lens group G2a and the second sub-lens group G2b integrally move in the optical axis direction). In other words, in the first through third numerical embodiments and in the sixth numerical embodiment, the zoom lens system is configured from four lens groups, i.e., a positive lens group, a negative lens group, a positive lens group and a positive lens group, in that order from the object side (the first lens group G1, the second lens group G2, the third lens group G3, and the fourth lens group G4P).

In the zoom lens system of the first and sixth numerical embodiments, as shown in the first zoom path of FIG. 37, upon zooming from the short focal length extremity (W) to the long focal length extremity (T), the first lens group G1 monotonically moves toward the object side, the second lens group G2 (the first sub-lens group G2a and the second sub-lens group G2b) monotonically moves toward the image side, the third lens group G3 monotonically moves toward the image side, and the fourth lens group G4P first moves toward the object side and thereafter returns (U-turns) toward the image side. Accordingly, the distance between the first lens group G1 and the second lens group G2 increases, the distance between the second lens group G2 and the third lens group G3 decreases, and the distance between the third lens group G3 and the fourth lens group G4P decreases.

In the zoom lens system of the second numerical embodiment, as shown in the second zoom path of FIG. 38, upon zooming from the short focal length extremity (W) to the long focal length extremity (T), the first lens group G1 monotonically moves toward the object side, the second lens group G2 (the first sub-lens group G2a and the second sub-lens group G2b) monotonically moves toward the image side, the third lens group G3 monotonically moves toward the object side, and the fourth lens group G4P monotonically moves toward the object side. Accordingly, the distance between the first lens group G1 and the second lens group G2 increases, the distance between the second lens group G2 and the third lens group G3 decreases, and the distance between the third lens group G3 and the fourth lens group G4P decreases.

In the zoom lens system of the third numerical embodiment, as shown in the third zoom path of FIG. 39, upon zooming from the short focal length extremity (W) to the long focal length extremity (T), the first lens group G1 monotonically moves toward the object side, the second lens group G2 (the first sub-lens group G2a and the second sub-lens group G2b) first moves toward the image side and thereafter returns (U-turns) toward the object side, the third lens group G3 monotonically moves toward the object side, and the fourth lens group G4P monotonically moves toward the object side. Accordingly, the distance between the first lens group G1 and the second lens group G2 increases, the distance between the second lens group G2 and the third lens group G3 decreases, and the distance between the third lens group G3 and the fourth lens group G4P decreases.

Figure 19:
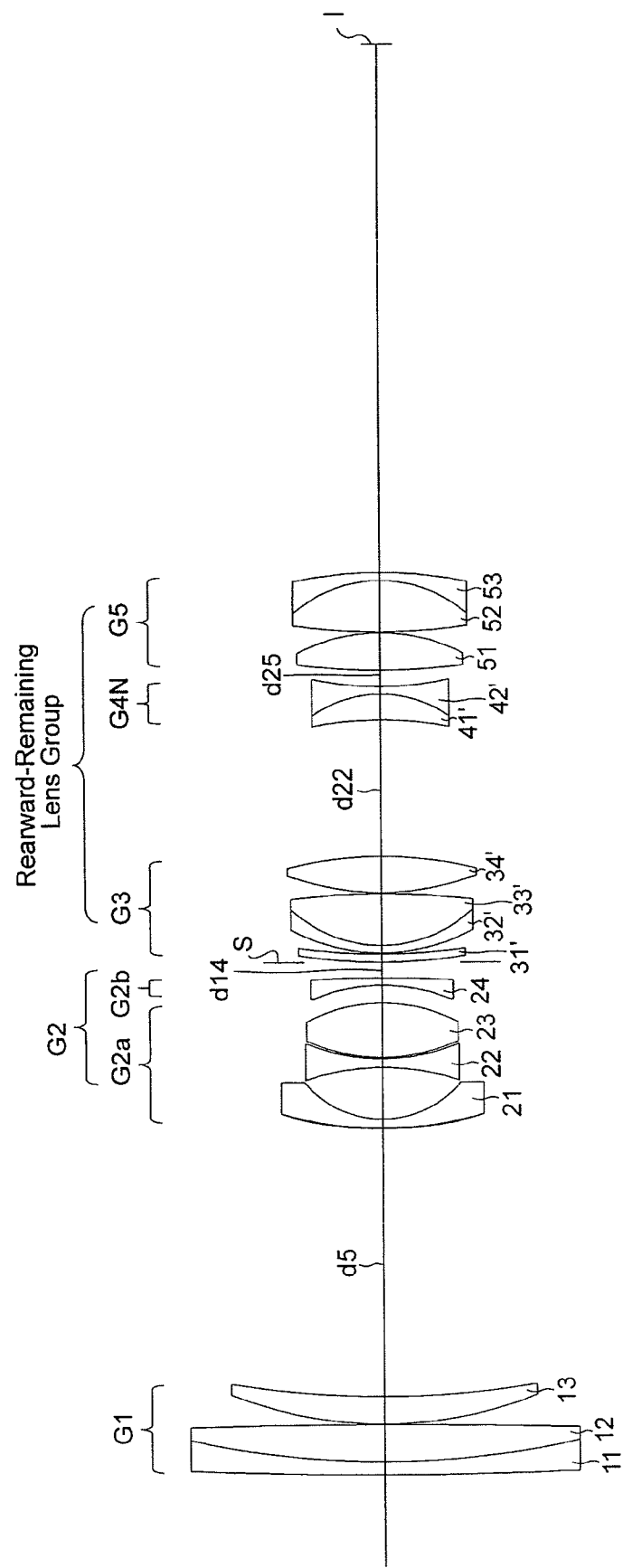
FIG. 19 shows a lens arrangement of a fourth numerical embodiment of a zoom lens system, according to the present invention, at the long focal length extremity when focused on an object at infinity.
Figures 20A, 20B, 20C, 20D:
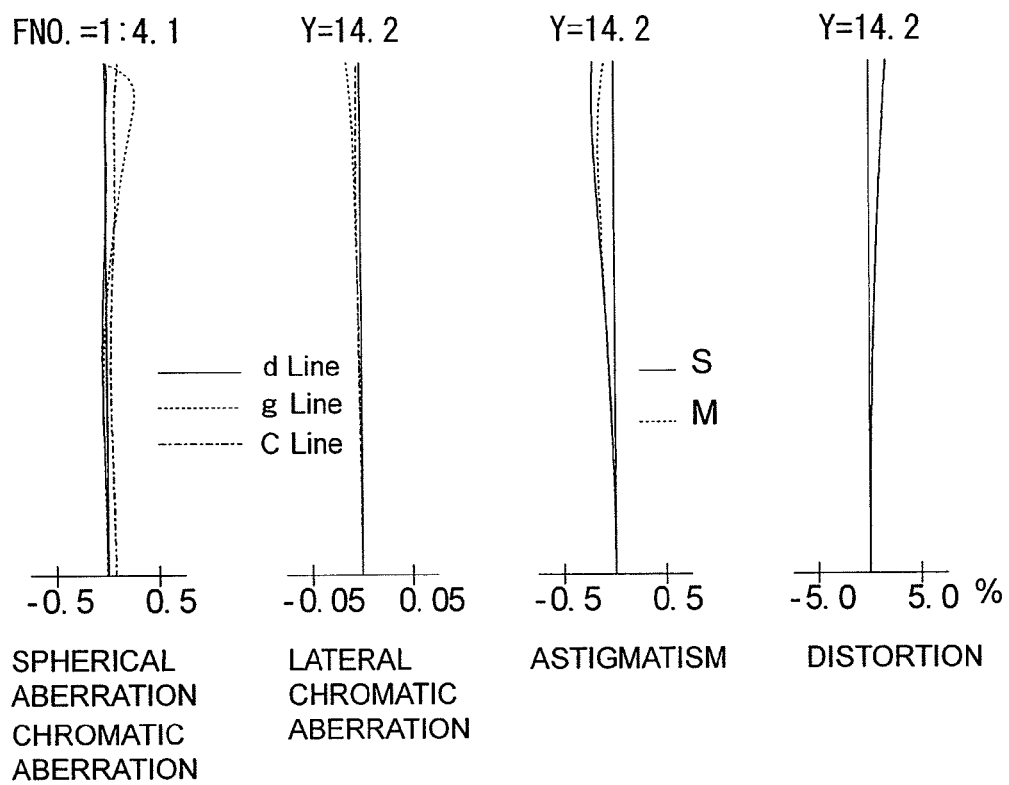
FIGS. 20A, 20B, 20C and 20D show various aberrations that occurred in the lens arrangement shown in FIG. 19.
Figure 21A:
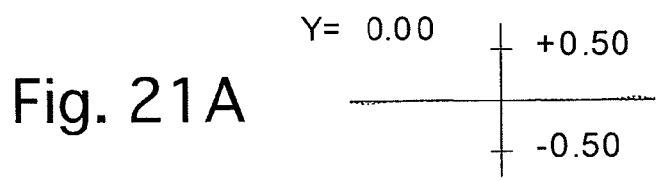
FIGS. 21A, 21B, 21C and 21D show various lateral aberrations that occurred in the lens arrangement shown in FIG. 19.
Figure 21B:
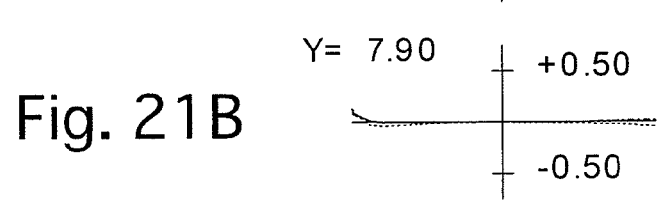
Figure 21C:
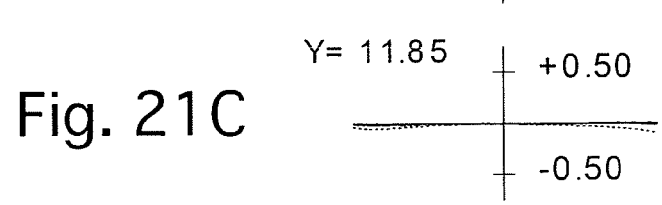
Figure 21D:
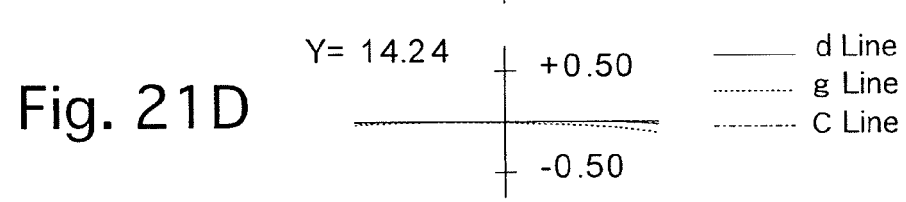
Figure 22:
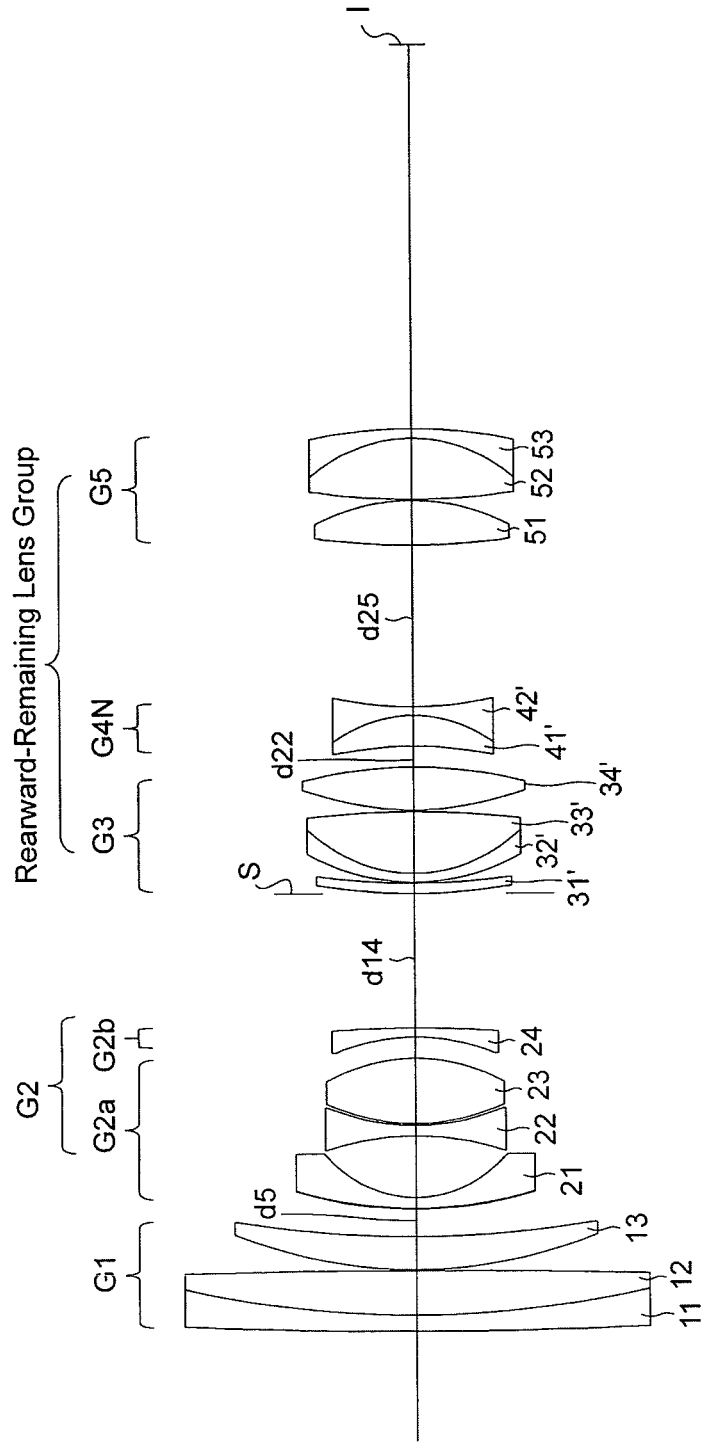
FIG. 22 shows a lens arrangement of the fourth numerical embodiment of the zoom lens system, according to the present invention, at the short focal length extremity when focused on an object at infinity.
Figure 40:
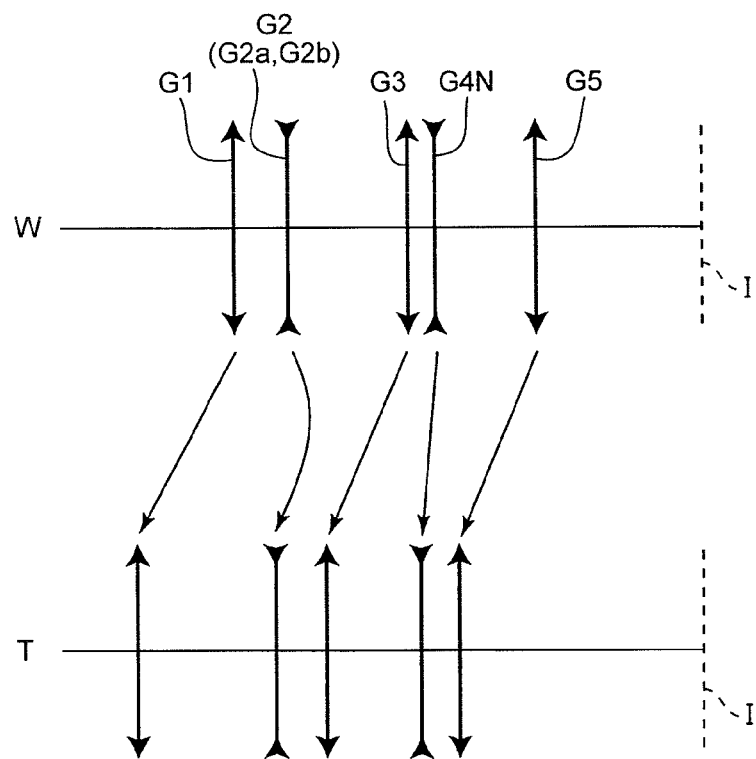
FIG. 40 shows a fourth zoom path of the zoom lens system according to the present invention.

The zoom lens system of the fourth numerical embodiment, as shown in the lens arrangements of FIGS. 19 and 22, and in the fourth zoom path of FIG. 40, is configured of a positive first lens group G1, a negative second lens group G2, a positive third lens group (rearward-remaining lens group) G3, a negative fourth lens group (rearward-remaining lens group) G4N, and a positive fifth lens group (rearward-remaining lens group) G5, in that order from the object side. The second lens group G2 is configured of a negative first sub-lens group G2a and a negative second sub-lens group G2b, in that order from the object side. 'I' designates the imaging plane.

The distance between the first sub-lens group G2a and the second sub-lens group G2b does not change (does not integrally move in the optical axis direction) during zooming from the short focal length extremity (W) to the long focal length extremity (T). In other words, the zoom lens system of the fourth numerical embodiment is configured from five lens groups, i.e., a positive lens group (first lens group G1), a negative lens group (second lens group G2), a positive lens group (third lens group G3), a negative lens group (fourth lens group G4N), and a positive lens group (fifth lens group G5), in that order from the object side.

In the zoom lens system of the fourth numerical embodiment, as shown in the fourth zoom path of FIG. 40, upon zooming from the short focal length extremity (W) to the long focal length extremity (T), the first lens group G1 monotonically moves toward the object side, the second lens group G2 (the first sub-lens group G2a and the second sub-lens group G2b) first moves toward the image side and thereafter returns (U-turns) toward the object side, the third lens group G3 monotonically moves toward the object side, the fourth lens group G4N monotonically moves toward the object side, and the fifth lens group G5 monotonically moves toward the object side. Accordingly, the distance between the first lens group G1 and the second lens group G2 increases, the distance between the second lens group G2 and the third lens group G3 decreases, the distance between the third lens group G3 and the fourth lens group G4N increases, and the distance between the fourth lens group G4N and the fifth lens group G5 decreases.

Figure 25:
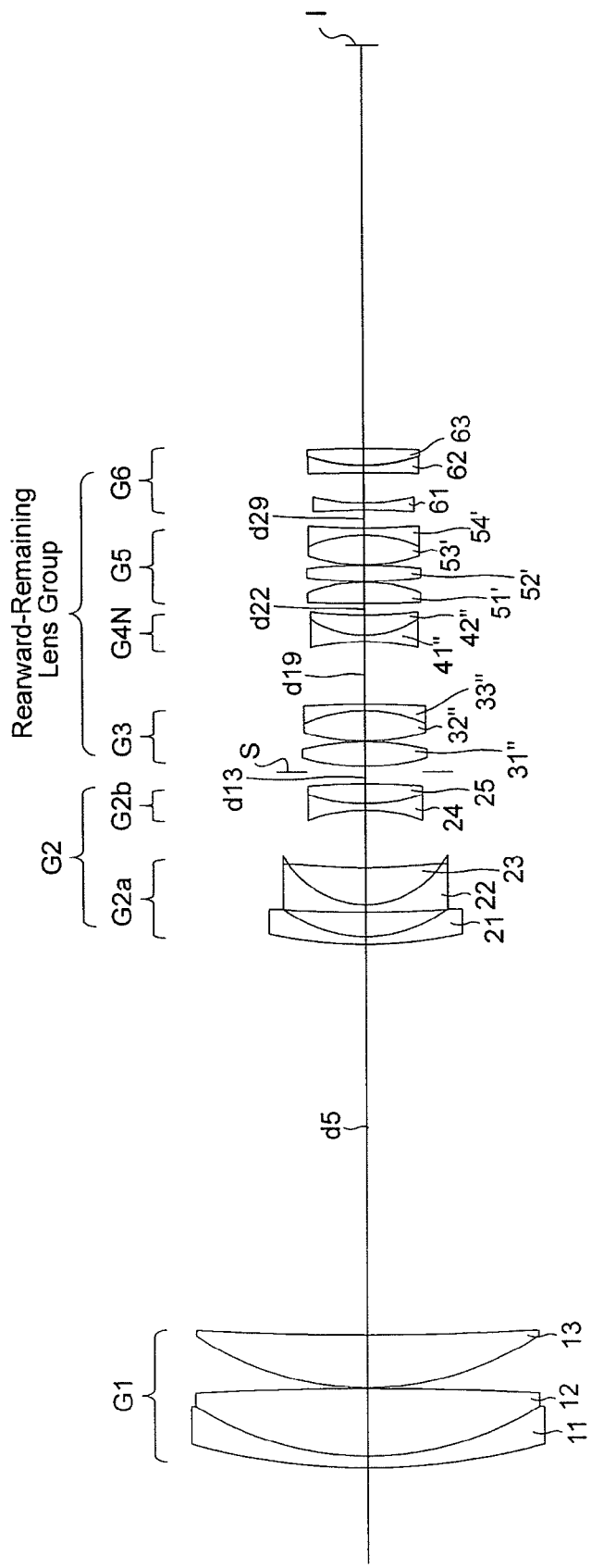
FIG. 25 shows a lens arrangement of a fifth numerical embodiment of a zoom lens system, according to the present invention, at the long focal length extremity when focused on an object at infinity.
Figures 26A, 26B, 26C, 26D:
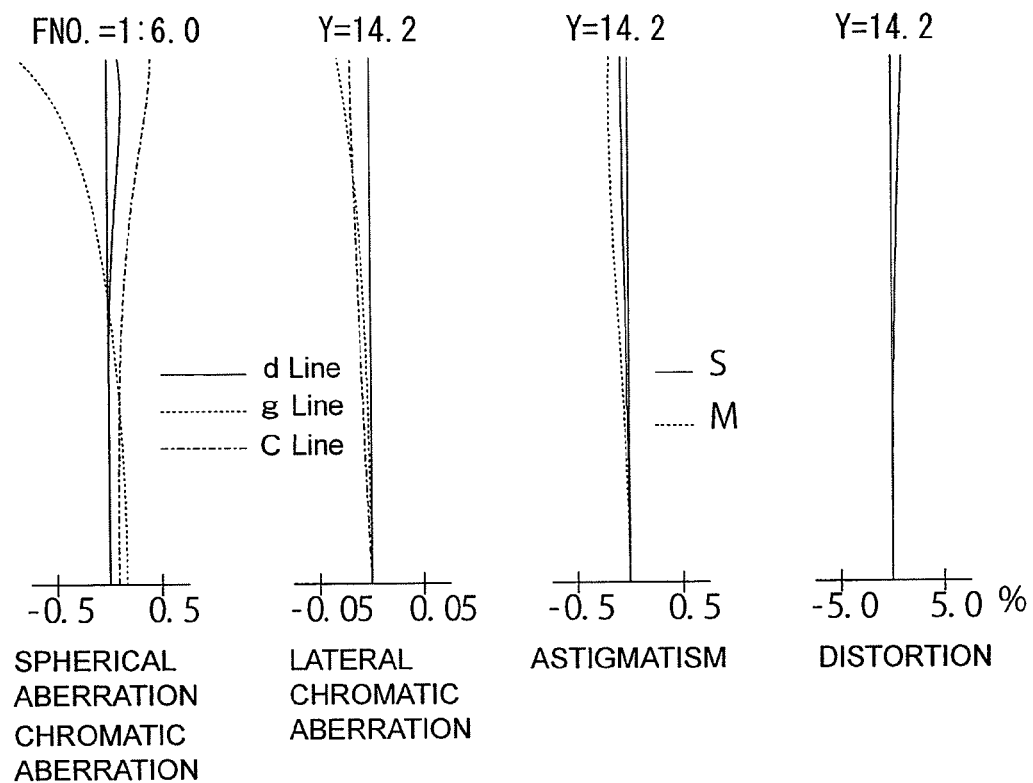
FIGS. 26A, 26B, 26C and 26D show various aberrations that occurred in the lens arrangement shown in FIG. 25.
Figure 27A:
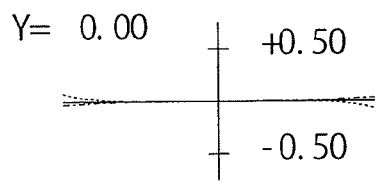
FIGS. 27A, 27B, and 27C show various lateral aberrations that occurred in the lens arrangement shown in FIG. 25.
Figure 27B:
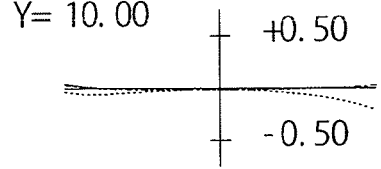
Figure 27C:
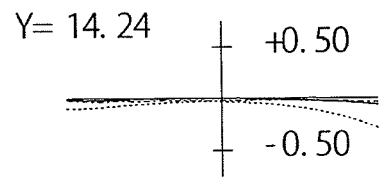
Figure 28:
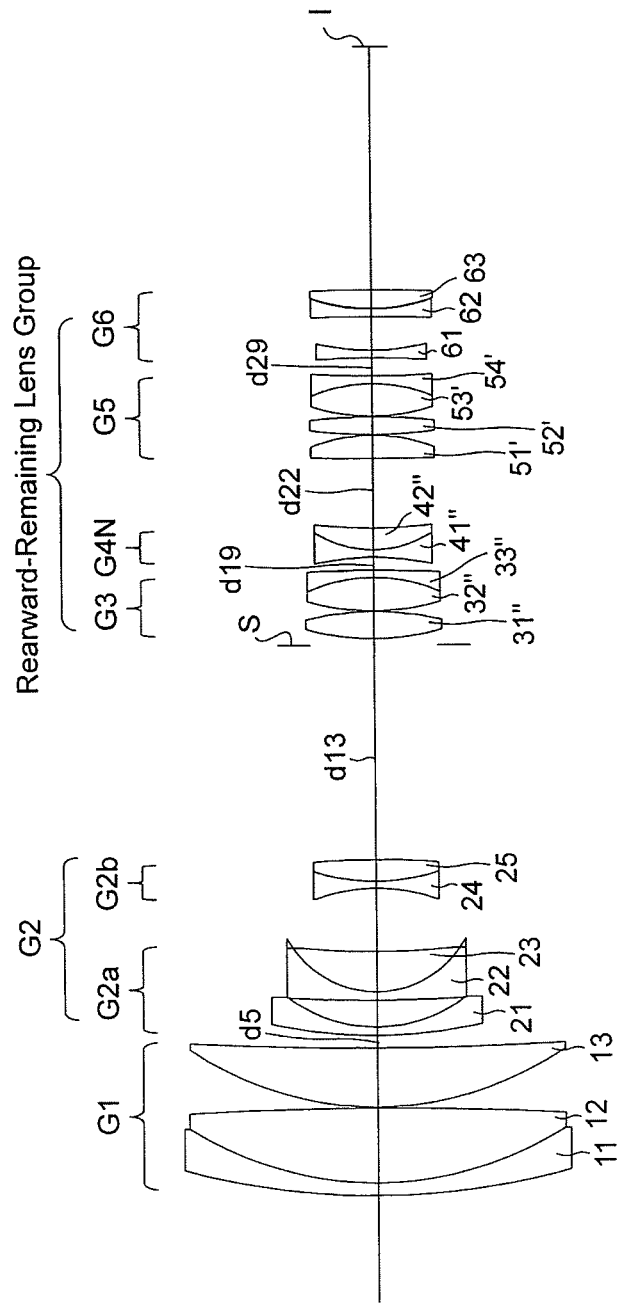
FIG. 28 shows a lens arrangement of the fifth numerical embodiment of the zoom lens system, according to the present invention, at the short focal length extremity when focused on an object at infinity.
Figures 29A, 29B, 29C, 29D:
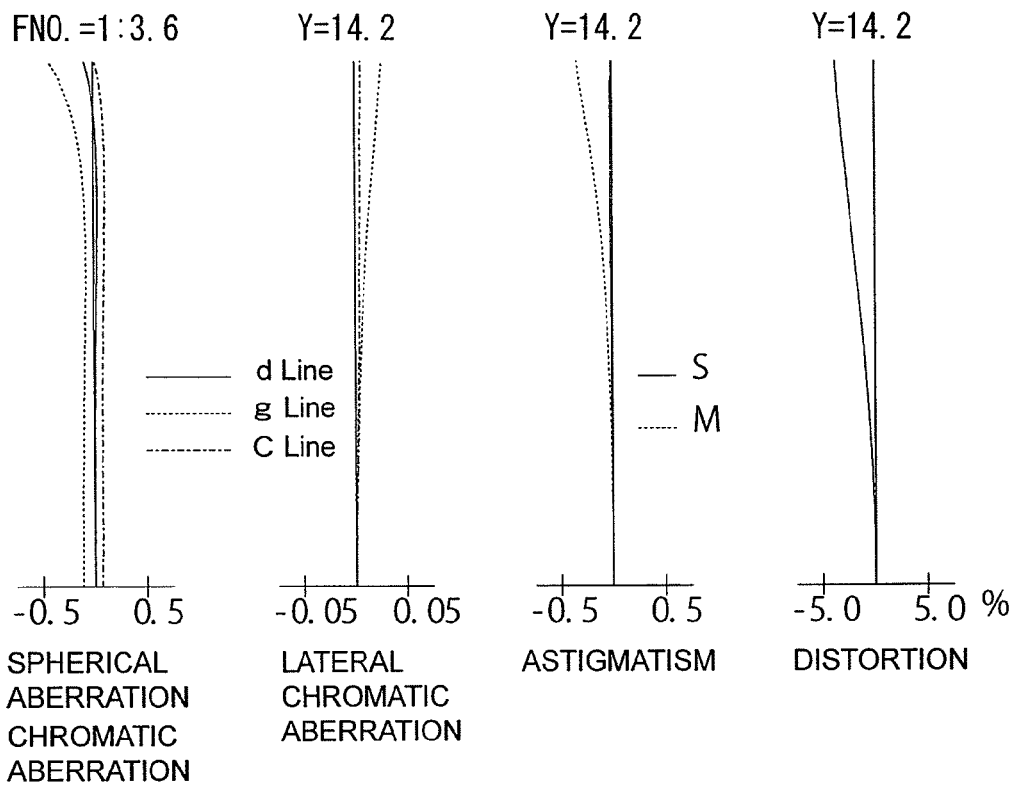
FIGS. 29A, 29B, 29C and 29D show various aberrations that occurred in the lens arrangement shown in FIG. 28.
Figure 30A:
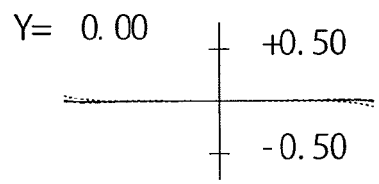
FIGS. 30A, 30B, and 30C show various lateral aberrations that occurred in the lens arrangement shown in FIG. 28.
Figure 30B:
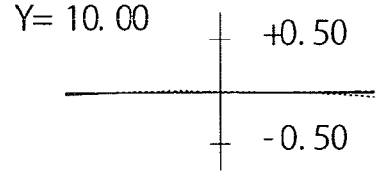
Figure 30C:
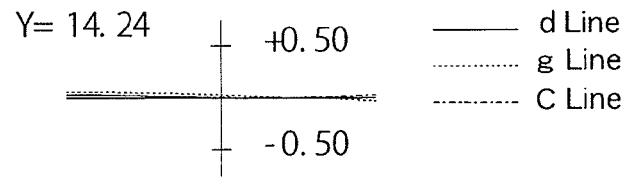
Figure 41:
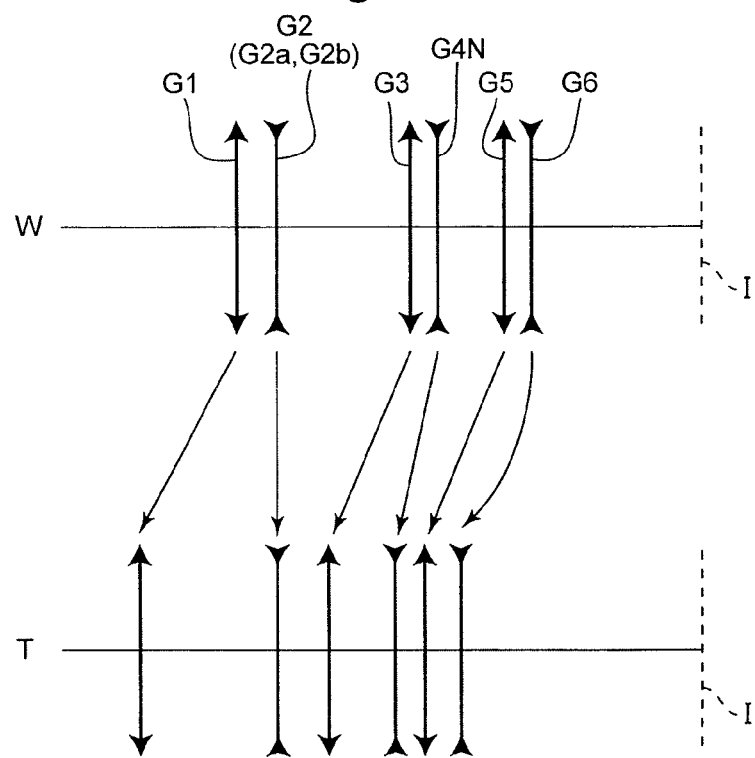
FIG. 41 shows a fifth zoom path of the zoom lens system according to the present invention.

The zoom lens system of the fifth numerical embodiment, as shown in the lens arrangements of FIGS. 25 and 28, and in the fifth zoom path of FIG. 41, is configured of a positive first lens group G1, a negative second lens group G2, a positive third lens group (rearward-remaining lens group) G3, a negative fourth lens group (rearward-remaining lens group) G4N, a positive fifth lens group (rearward-remaining lens group) G5, and a negative sixth lens group (rearward-remaining lens group) G6, in that order from the object side. The second lens group G2 is configured of a negative first sub-lens group G2a and a negative second sub-lens group G2b, in that order from the object side. 'I' designates the imaging plane.

The distance between the first sub-lens group G2a and the second sub-lens group G2b does not change (does not integrally move in the optical axis direction) during zooming from the short focal length extremity (W) to the long focal length extremity (T). In other words, the zoom lens system of the fifth numerical embodiment is configured from six lens groups, i.e., a positive lens group (first lens group G1), a negative lens group (second lens group G2), a positive lens group (third lens group G3), a negative lens group (fourth lens group G4N), a positive lens group (fifth lens group G5), and a negative lens group (sixth lens group G6), in that order from the object side.

In the zoom lens system of the fifth numerical embodiment, as shown in the fifth zoom path of FIG. 41, upon zooming from the short focal length extremity (W) to the long focal length extremity (T), the first lens group G1 monotonically moves toward the object side, the second lens group G2 does not move (remains stationary), the third lens group G3 monotonically moves toward the object side, the fourth lens group G4N monotonically moves toward the object side, the fifth lens group G5 monotonically moves toward the object side, and the sixth lens group G6 moves toward the object side while plotting a convex path that faces the image side. Accordingly, the distance between the first lens group G1 and the second lens group G2 increases, the distance between the second lens group G2 and the third lens group G3 decreases, the distance between the third lens group G3 and the fourth lens group G4N increases, the distance between the fourth lens group G4N and the fifth lens group G5 decreases, and the distance between the fifth lens group G5 and the sixth lens group G6 increases.

In the zoom lens system of the illustrated embodiments, the second lens group G2 is divided into the first sub-lens group G2*a* and the second sub-lens group G2*b*. The first sub-lens group G2*a* does not move (is stationary relative to the image plane I) in the optical axis direction during a focusing operation, and the second sub-lens group G2*b* moves in the optical axis direction during a focusing operation.

Accordingly, the focusing lens group (i.e., the second sub-lens group G2*b*) can be miniaturized and reduced in weight, so that a rapid (high-speed) focusing operation can be achieved, and so that the operational noise that occurs during an electrically-driven focusing operation can be reduced since the driving force necessary for the focusing operation is reduced.

These functional effects of the present invention are distinctively manifested in an arrangement in which the second sub-lens group G2*b*, which constitutes the focusing lens group, is configured of a negative single lens element 24, as in the first through fourth numerical embodiments, and the sixth numerical embodiment. Furthermore, fluctuations in chromatic aberration occurring during a focusing operation can be reduced by configuring the second sub-lens group G2*b*, which constitutes the focusing lens group, of a cemented lens formed by a negative lens element 24 and a positive lens element 25, as in the fifth numerical embodiment.

Furthermore, in the zoom lens system of the illustrated embodiments, since both the first sub-lens group G2*a* and the second sub-lens group G2*b* are used to correct aberrations within the second lens group G2 by not allowing the distance between the first sub-lens group G2*a* and the second sub-lens group G2*b* to change during zooming from the short focal length extremity to the long focal length extremity, aberration fluctuations occurring during zooming can be reduced. Accordingly, in the zoom lens system of the illustrated embodiment, the second sub-lens group G2*b*, which is reduced in size (miniaturized) and reduced in weight due to being configured of only the single negative lens element 24 or of a cemented lens formed by the negative lens element 24 and the positive lens element 25, is provided with only an image-plane-position correction function during a focusing operation.

In the zoom lens system of the illustrated embodiments, at least two lens groups (of the third lens group G3, the fourth lens group G4P or G4N, the fifth lens group G5, and the sixth lens group G6) which mutually change the distance therebetween during zooming from the short focal length extremity to the long focal length extremity are provided in the rearward-remaining lens group, having a positive refractive power, which is positioned on the image side of the second lens group G2.

Accordingly, field curvature occurring during zooming can be favorably corrected, so that a superior optical quality can be achieved.

Condition (1) specifies the ratio of the focal length of the second lens group G2 to the focal length of the second sub-lens group G2*b*. By satisfying condition (1), a rapid (high-speed) focusing operation can be achieved, and changes in spherical aberration and field curvature can be suppressed during a focusing operation, thereby achieving a superior optical quality.

If the upper limit of condition (1) is exceeded, the refractive power of the second sub-lens group G2*b* becomes too strong, so that the changes in spherical aberration and field curvature increase, thereby deteriorating the optical quality of the zoom lens system.

If the lower limit of condition (1) is exceeded, the refractive power of the second sub-lens group G2*b* becomes too weak, so that the amount of movement in the optical axis direction of the second sub-lens group G2*b* during a focusing operation increases, thereby making it difficult to carry out a rapid focusing operation.

Condition (2) specifies the Abbe number at the d-line of the negative lens element 24 that is provided in the second sub-lens group G2*b*, which constitutes the focusing lens group. By satisfying condition (2), fluctuations in chromatic aberration that occur during a focusing operation can be favorably corrected, thereby achieving a superior optical quality.

If the lower limit of condition (2) is exceeded, fluctuations in chromatic aberration that occur during a focusing operation become excessively large, thereby deteriorating the optical quality of the zoom lens system.

Condition (3) specifies the refractive index at the d-line of the negative lens element 24 in the second sub-lens group G2*b*, which constitutes the focusing lens group. By satisfying condition (3), fluctuations in spherical aberration that occur during a focusing operation can be favorably corrected, thereby achieving a superior optical quality.

If the lower limit of condition (3) is exceeded, fluctuations in spherical aberration that occur during a focusing operation becomes excessively large, thereby deteriorating the optical quality of the zoom lens system.

Condition (4) specifies the ratio of the focal length of the first sub-lens group G2*a* to the focal length of the second sub-lens group G2*b*. By satisfying condition (4), a rapid focusing operation can be achieved, while changes in spherical aberration and field curvature during a focusing operation can be suppressed, thereby achieving a superior optical quality.

If the upper limit of condition (4) is exceeded, the refractive power of the second sub-lens group G2*b* becomes too strong, so that changes in spherical aberration and field curvature during a focusing operation increase, thereby deteriorating the optical quality of the zoom lens system.

If the lower limit of condition (4) is exceeded, the optical power of the second sub-lens group G2*b* becomes too weak, so that since the amount of movement of the second sub-lens group G2b in the optical axis direction during a focusing operation increases, it becomes difficult to carry out a rapid focusing operation.

Specific numerical embodiments (first through sixth numerical embodiments) will be herein discussed. In the aberration diagrams, lateral aberration diagrams, and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and νd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

Figure 1:
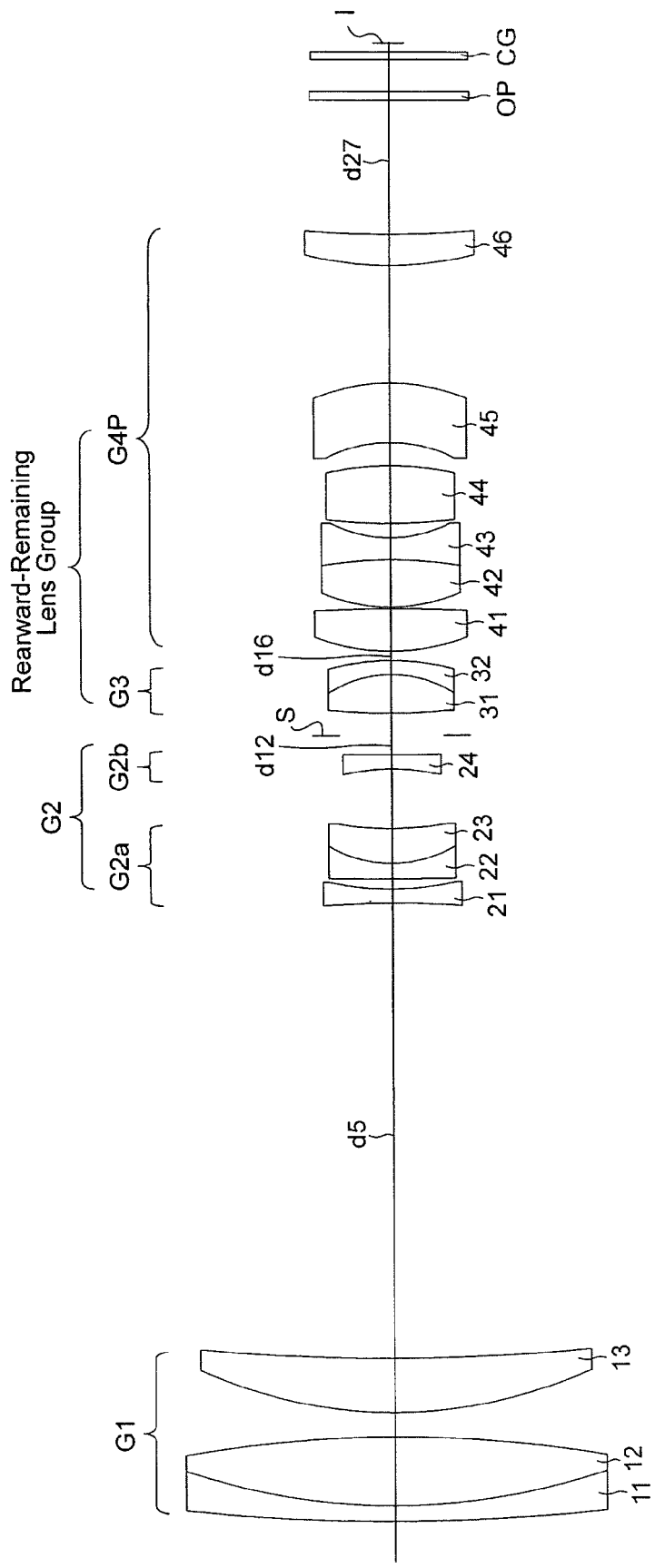
FIG. 1 shows a lens arrangement of a first numerical embodiment of a zoom lens system, according to the present invention, at the long focal length extremity when focused on an object at infinity.
Figure 4:
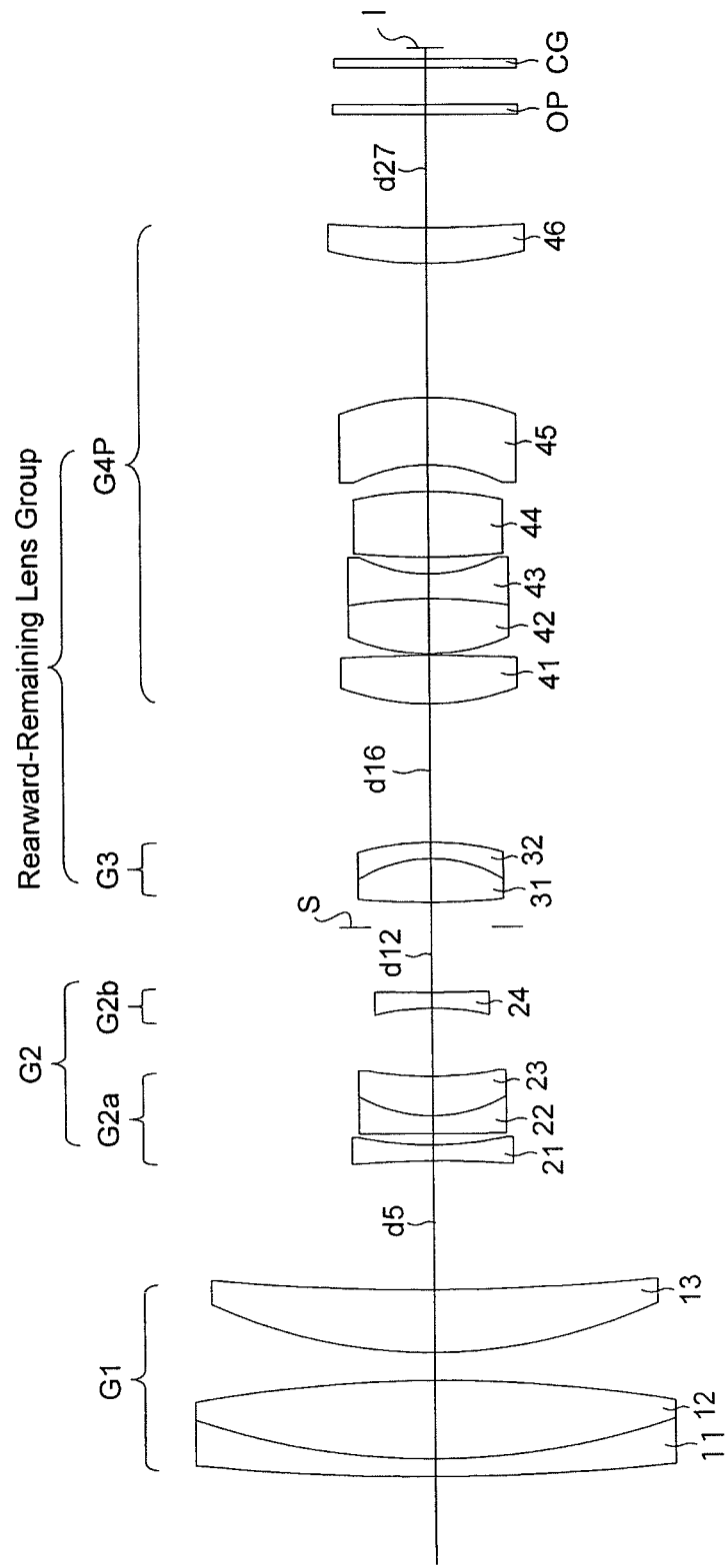
FIG. 4 shows a lens arrangement of the first numerical embodiment of the zoom lens system, according to the present invention, at the short focal length extremity when focused on an object at infinity.
Figures 5A, 5B, 5C, 5D:
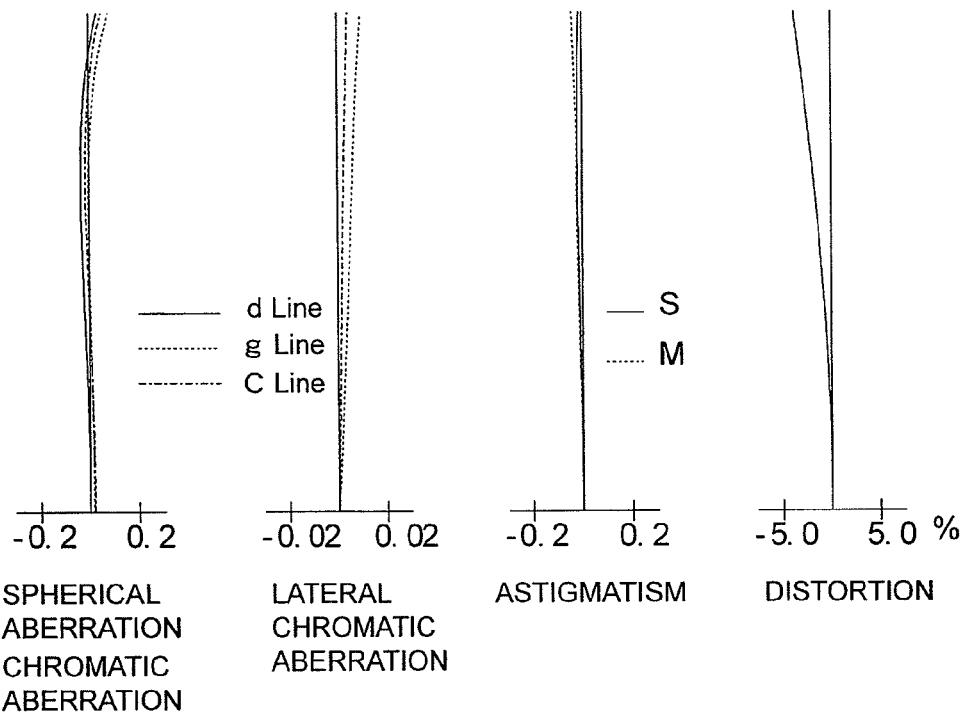
FIGS. 5A, 5B, 5C and 5D show various aberrations that occurred in the lens arrangement shown in FIG. 4.
Figure 6A:
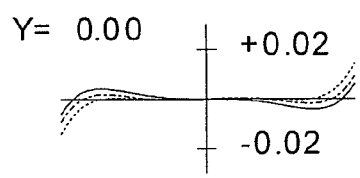
FIGS. 6A, 6B, 6C and 6D show various lateral aberrations that occurred in the lens arrangement shown in FIG. 4.
Figure 6B:
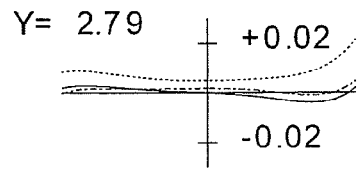
Figure 6C:
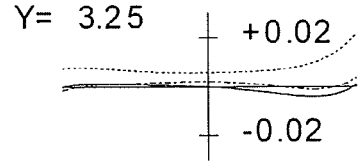
Figure 6D:
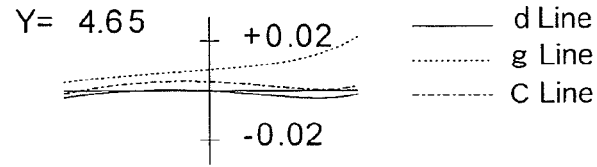
Figures 8A, 8B, 8C, 8D:
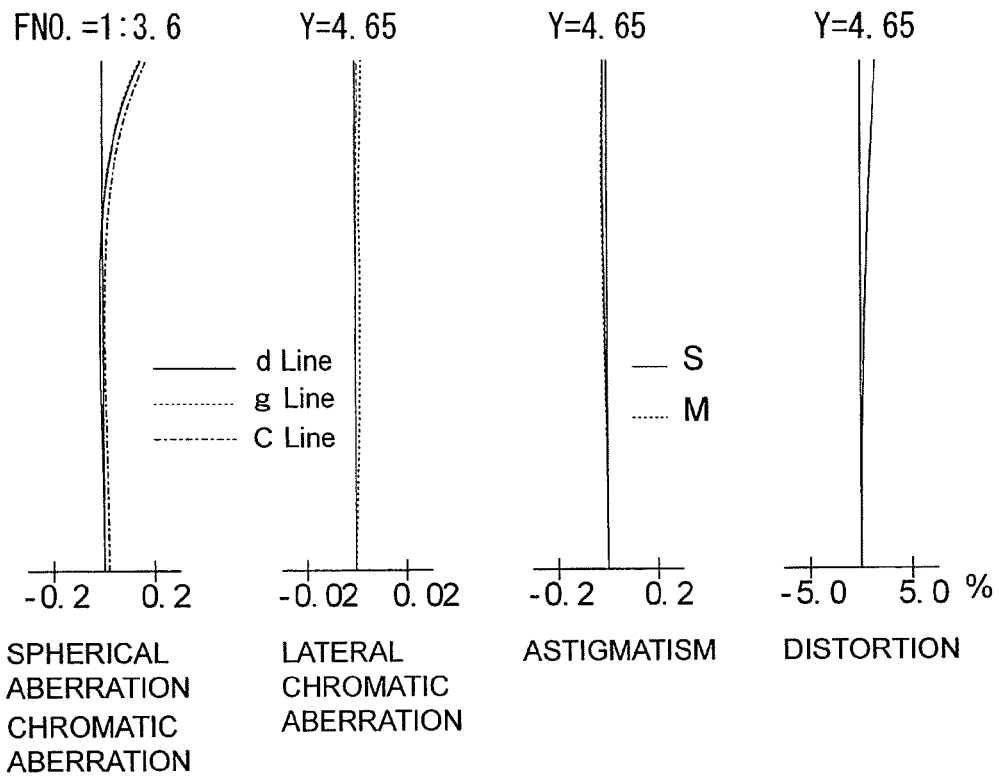
FIGS. 8A, 8B, 8C and 8D show various aberrations that occurred in the lens arrangement shown in FIG. 7.

FIGS. 1 through 6D and Tables 1 through 3 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment of the zoom lens system at the short focal length extremity when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 1 shows the lens surface data, Table 2 shows various data of the zoom lens system, Table 3 shows various data of the lens groups of the first numerical embodiment of the zoom lens system according to the present invention.

The zoom lens system of the first numerical embodiment is configured of a positive first lens group G1, a negative second lens group G2, and a positive rearward-remaining lens group, in that order from the object side. The second lens group G2 is configured of a negative first sub-lens group G2a and a negative second sub-lens group G2b, in that order from the object side. The rearward-remaining lens group is configured of a positive third lens group G3 and a positive fourth lens group G4P, in that order from the object side. An optical filter OP and a cover glass CG are provided behind the fourth lens group G4P (and between the image plane I and the fourth lens group G4P).

The first lens group G1 is configured of a cemented lens formed by a negative meniscus lens element 11 having a convex surface on the object side and a biconvex positive lens element 12, in that order from the object side; and a positive meniscus lens element 13 having a convex surface on the object side.

The first sub-lens group G2a is configured of a biconcave negative lens element 21, and a cemented lens formed by a negative meniscus lens element 22 having a convex surface on the object side, and a positive meniscus lens element 23 having a convex surface on the object side, in that order from the object side. The first sub-lens group G2a does not move (remains stationary with respect to the image plane I) in the optical axis direction during a focusing operation.

The second sub-lens group G2b is configured of a biconcave negative single lens element 24. The second sub-lens group G2b (biconcave negative single lens element 24) is a focusing lens group which is moved in the optical axis direction during a focusing operation. Namely, upon focusing on an object at infinity through to an object at a finite distance, the second sub-lens group G2b (biconcave negative single lens element 24) is moved toward the object side in the optical axis direction.

The third lens group G3 is configured of a cemented lens formed from a biconvex positive lens element 31 and a negative meniscus lens element 32 having a convex surface on the image side, in that order from the object side. A diaphragm S, which is provided in between the second lens group G2 (the second sub-lens group G2b) and the third lens group G3, moves integrally with the third lens group G3 in the optical axis direction.

The fourth lens group G4P is configured of a biconvex positive lens element 41, a cemented lens formed from a biconvex positive lens element 42 and a biconcave negative lens element 43; a biconvex positive lens element 44, a negative meniscus lens element 45 having a convex surface on the image side, and a positive meniscus lens element 46 having a convex surface on the object side, in that order from the object side.

TABLE 1

SURFACE DATA

| Surf. No. | r | d | N (d) | νd |
|---|---|---|---|---|
| 1 | 139.291 | 1.000 | 1.83400 | 37.3 |
| 2 | 42.773 | 4.465 | 1.49700 | 81.6 |
| 3 | −81.069 | 1.561 | | |
| 4 | 31.248 | 3.480 | 1.49700 | 81.6 |
| 5 | 136.645 | d5 | | |
| 6 | −64.943 | 0.900 | 1.72916 | 54.7 |
| 7 | 20.797 | 0.632 | | |
| 8 | 421.459 | 1.000 | 1.60240 | 60.8 |
| 9 | 8.630 | 2.222 | 1.81102 | 25.2 |
| 10 | 21.760 | 3.826 | | |
| 11 | −14.583 | 0.900 | 1.60000 | 65.3 |
| 12 | 148.081 | d12 | | |
| 13 (Diaphragm) | ∞ | 1.400 | | |
| 14 | 45.837 | 2.457 | 1.48788 | 70.2 |
| 15 | −8.015 | 0.900 | 1.70013 | 54.4 |
| 16 | −16.457 | d16 | | |
| 17 | 14.673 | 2.714 | 1.77200 | 49.7 |
| 18 | −99.134 | 0.100 | | |
| 19 | 11.610 | 3.074 | 1.49700 | 81.6 |
| 20 | −28.753 | 1.400 | 1.80486 | 35.8 |

TABLE 1-continued

SURFACE DATA

| Surf. No. | r | d | N (d) | vd |
|---|---|---|---|---|
| 21 | 8.976 | 0.922 | | |
| 22 | 39.215 | 3.675 | 1.70519 | 53.6 |
| 23 | −20.425 | 1.493 | | |
| 24 | −9.666 | 3.809 | 1.84700 | 23.8 |
| 25 | −13.807 | 7.487 | | |
| 26 | 22.698 | 2.000 | 1.48749 | 70.2 |
| 27 | 79.352 | d27 | | |
| 28 | ∞ | 0.550 | 1.51633 | 64.1 |
| 29 | ∞ | 2.020 | | |
| 30 | ∞ | 0.500 | 1.51633 | 64.1 |
| 31 | ∞ | — | | |

TABLE 2

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.3 | 3.5 |
| f | 15.30 | 26.00 | 44.10 |
| W | 18.8 | 10.9 | 6.4 |
| Y | 4.65 | 4.65 | 4.65 |
| fB | 0.53 | 0.53 | 0.53 |
| L | 80.00 | 87.34 | 94.58 |
| d5 | 7.233 | 18.248 | 29.206 |
| d12 | 3.676 | 2.336 | 1.250 |
| d16 | 7.762 | 2.759 | 0.600 |
| d27 | 6.310 | 8.980 | 8.509 |

TABLE 3

LENS GROUP DATA

| Lens Group | 1$^{st}$ Surf. | Focal Length |
|---|---|---|
| 1 | 1 | 60.01 |
| Sub-1(2) | 6 | −16.72 |
| Sub-2(2) | 11 | −22.08 |
| 3 | 14 | 37.36 |
| 4 | 17 | 20.53 |

Numerical Embodiment 2

Figure 10:
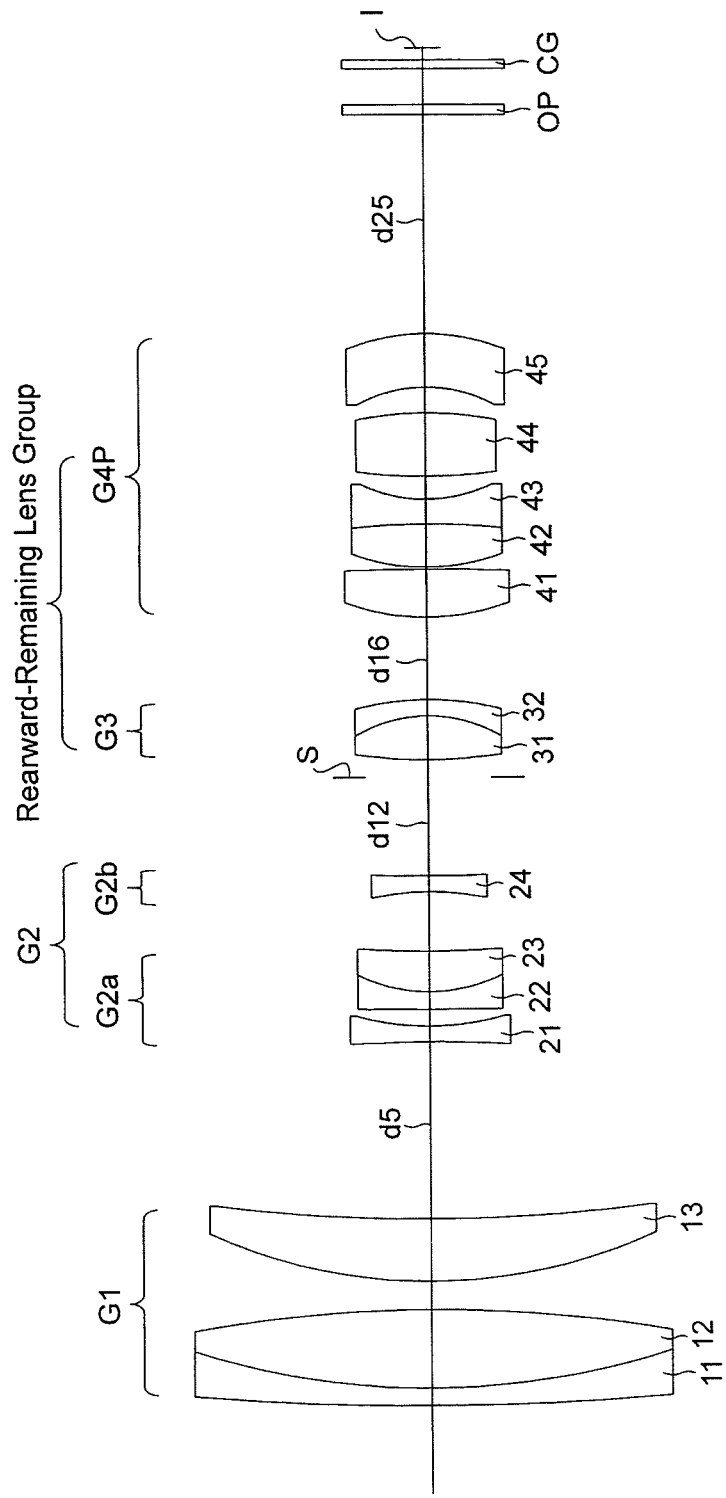
FIG. 10 shows a lens arrangement of the second numerical embodiment of the zoom lens system, according to the present invention, at the short focal length extremity when focused on an object at infinity.
Figures 11A, 11B, 11C, 11D:
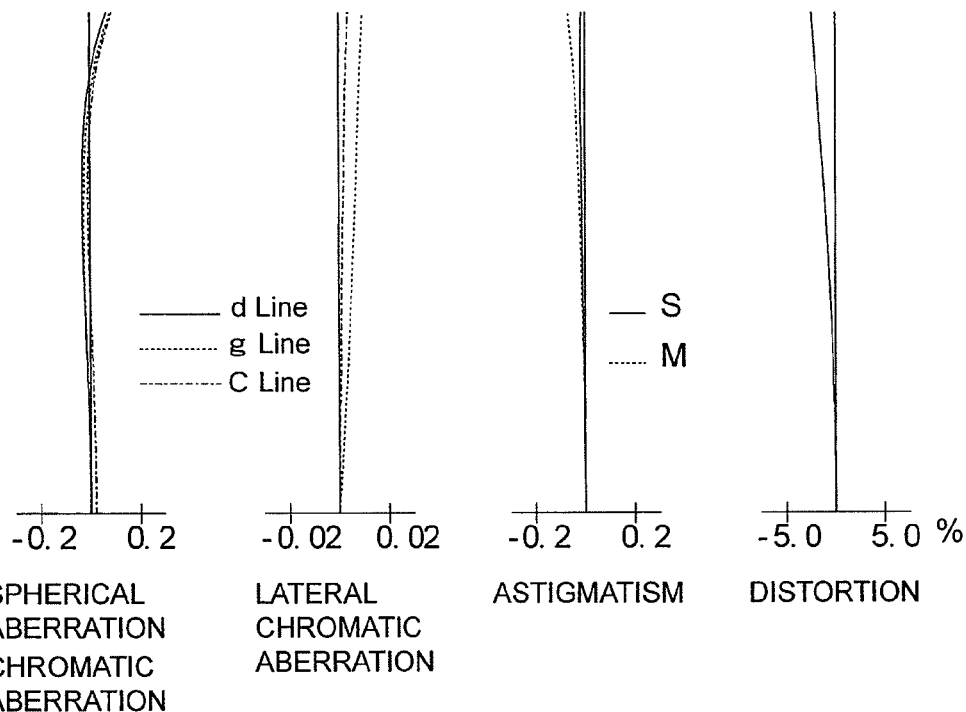
FIGS. 11A, 11B, 11C and 11D show various aberrations that occurred in the lens arrangement shown in FIG. 10.
Figure 12A:
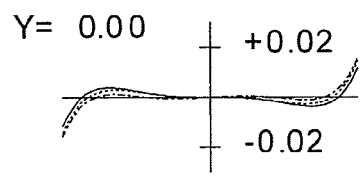
FIGS. 12A, 12B, 12C and 12D show various lateral aberrations that occurred in the lens arrangement shown in FIG. 10.
Figure 12B:
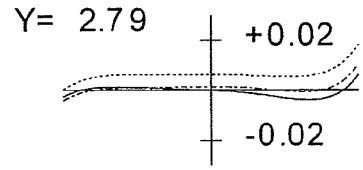
Figure 12C:
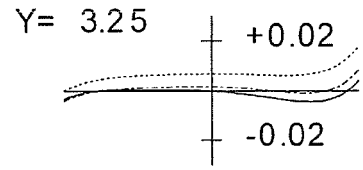
Figure 12D:
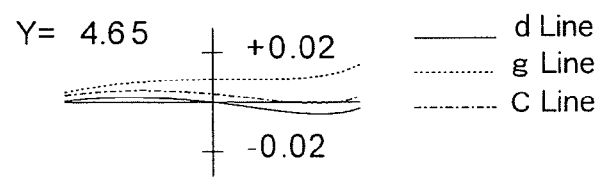

FIGS. 7 through 12D and Tables 4 through 6 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIG. 10 shows a lens arrangement of the second numerical embodiment of the zoom lens system at the short focal length extremity when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 4 shows the lens surface data, Table 5 shows various data of the zoom lens system, Table 6 shows various data of the lens groups of the second numerical embodiment of the zoom lens system according to the present invention.

The fundamental lens arrangement of the second numerical embodiment is the same as that of the first numerical embodiment, except for the following aspect:

(1) The fourth lens group G4P is not provided, on the image side thereof, with the positive meniscus lens element 46, having a convex surface on the object side.

TABLE 4

SURFACE DATA

| Surf. No. | r | d | N (d) | vd |
|---|---|---|---|---|
| 1 | 167.433 | 1.000 | 1.83400 | 37.3 |
| 2 | 45.146 | 4.465 | 1.49700 | 81.6 |
| 3 | −80.907 | 1.565 | | |
| 4 | 31.901 | 3.480 | 1.49700 | 81.6 |
| 5 | 100.848 | d5 | | |
| 6 | −103.008 | 0.900 | 1.72916 | 54.7 |
| 7 | 15.933 | 0.943 | | |
| 8 | 254.817 | 1.000 | 1.64853 | 57.9 |
| 9 | 9.661 | 2.282 | 1.84700 | 23.8 |
| 10 | 55.564 | 3.346 | | |
| 11 | −15.536 | 0.900 | 1.70000 | 55.7 |
| 12 | 106.940 | d12 | | |
| 13 (Diaphragm) | ∞ | 1.000 | | |
| 14 | 29.456 | 2.457 | 1.48749 | 70.3 |
| 15 | −8.401 | 0.900 | 1.80500 | 36.7 |
| 16 | −17.296 | d16 | | |
| 17 | 13.620 | 2.714 | 1.76740 | 50.1 |
| 18 | −144.276 | 0.100 | | |
| 19 | 12.585 | 2.436 | 1.49700 | 81.6 |
| 20 | −40.079 | 1.400 | 1.77543 | 37.0 |
| 21 | 8.987 | 1.286 | | |
| 22 | 31.383 | 3.580 | 1.83251 | 42.7 |
| 23 | −20.595 | 1.455 | | |
| 24 | −8.341 | 3.029 | 1.84700 | 23.8 |
| 25 | −12.048 | d25 | | |
| 26 | ∞ | 0.550 | 1.51633 | 64.1 |
| 27 | ∞ | 2.020 | | |
| 28 | ∞ | 0.500 | 1.51633 | 64.1 |
| 29 | ∞ | — | | |

TABLE 5

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.3 | 3.6 |
| f | 15.30 | 26.00 | 44.10 |
| W | 17.3 | 10.1 | 5.9 |
| Y | 4.65 | 4.65 | 4.65 |
| fB | 0.53 | 0.53 | 0.53 |
| L | 76.24 | 85.03 | 95.00 |
| d5 | 9.940 | 20.139 | 31.784 |
| d12 | 5.530 | 2.925 | 1.250 |
| d16 | 4.656 | 2.016 | 0.600 |
| d25 | 12.279 | 16.113 | 17.530 |

TABLE 6

LENS GROUP DATA

| Lens Group | 1$^{st}$ Surf. | Focal Length |
|---|---|---|
| 1 | 1 | 68.65 |
| Sub-1(2) | 6 | −22.17 |
| Sub-2(2) | 11 | −19.32 |
| 3 | 14 | 39.18 |
| 4 | 17 | 18.12 |

Numerical Embodiment 3

Figure 13:
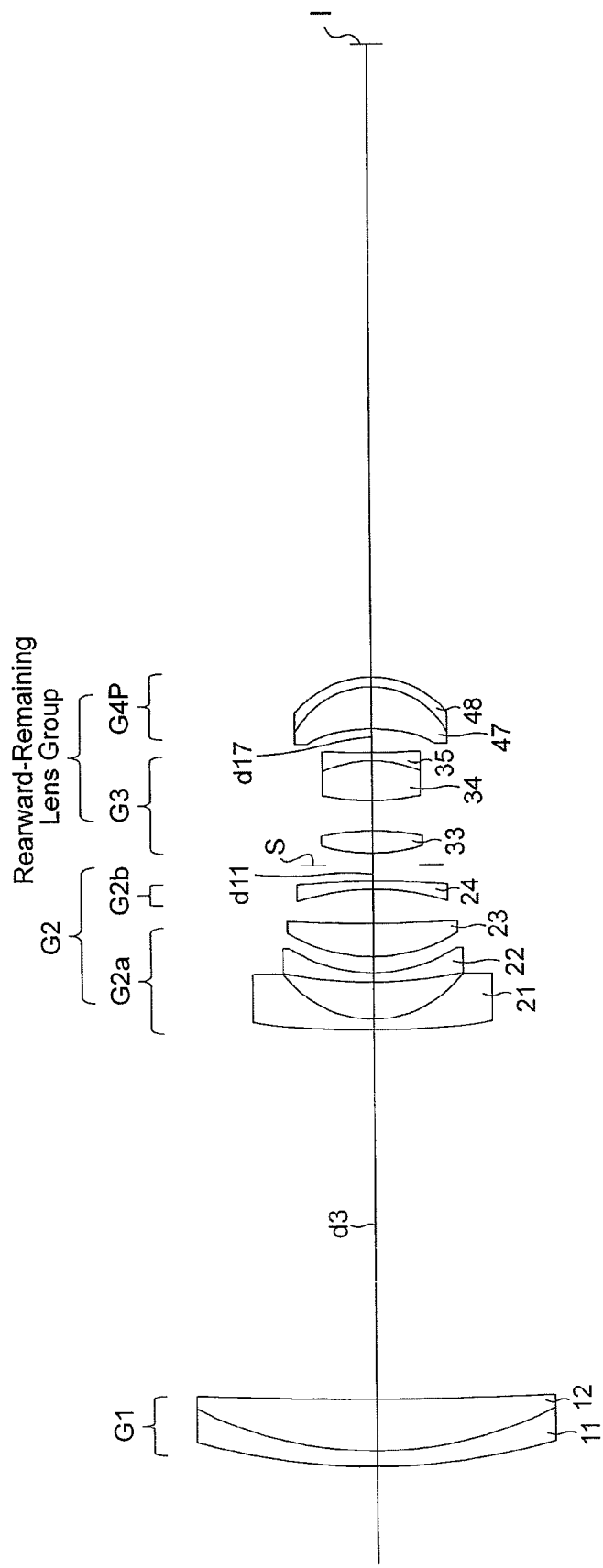
FIG. 13 shows a lens arrangement of a third numerical embodiment of a zoom lens system, according to the present invention, at the long focal length extremity when focused on an object at infinity.
Figure 16:
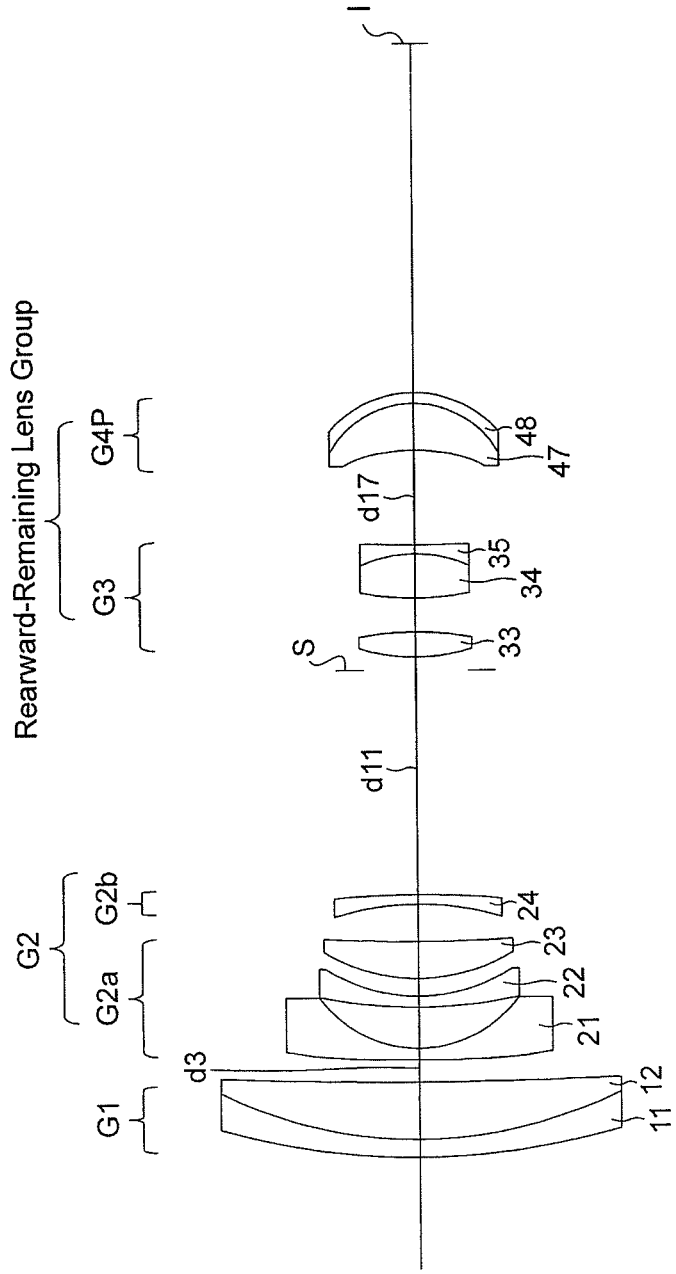
FIG. 16 shows a lens arrangement of the third numerical embodiment of the zoom lens system, according to the present invention, at the short focal length extremity when focused on an object at infinity.

FIGS. 13 through 18D and Tables 7 through 10 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows a lens arrangement of the third numerical embodiment of the zoom lens system at the short focal length extremity when focused on an object at infinity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 7 shows the lens surface data, Table 8 shows various data of the zoom lens system, Table 9 shows the aspherical surface data, and Table 10 shows various data of the lens groups of the third numerical embodiment of the zoom lens system according to the present invention.

The fundamental lens arrangement of the third numerical embodiment is the same as that of the first numerical embodiment, except for the following aspects:

(1) The first lens group G1 is configured of a cemented lens formed from a negative meniscus lens element 11 having a convex surface on the object side, and a positive meniscus lens element 12 having a convex surface on the object side, in that order from the object side.

(2) The first sub-lens group G2a is configured of a negative meniscus lens element 21 having a convex surface on the object side, a negative meniscus lens element 22 having a convex surface on the object side, and a positive meniscus lens element 23 having a convex surface on the object side, in that order from the object side. An aspherical surface is formed on the object side of the negative meniscus lens element 21.

(3) The negative single lens element 24 of the second sub-lens group G2b is a negative meniscus lens element having a convex surface on the image side.

(4) The third lens group G3 is configured of a biconvex positive lens element 33, and a cemented lens formed form a biconvex positive lens element 34 and a biconcave negative lens element 35, in that order from the object side.

(5) The fourth lens group G4P is configured of a positive meniscus lens element 47 having a convex surface on the image side, and a negative meniscus lens element 48 having a convex surface on the image side, in that order from the object side.

(6) The optical filter OP and the cover glass CG are not provided behind the fourth lens group G4P.

TABLE 7

SURFACE DATA

| Surf. No. | r | d | N(d) | vd |
|---|---|---|---|---|
| 1 | 83.618 | 2.000 | 1.80518 | 25.4 |
| 2 | 51.962 | 6.496 | 1.69680 | 55.5 |
| 3 | 527.075 | d3 | | |
| 4* | 384.913 | 1.300 | 1.77250 | 49.6 |
| 5 | 14.500 | 4.648 | | |
| 6 | 59.867 | 1.200 | 1.77250 | 49.6 |
| 7 | 20.347 | 1.986 | | |
| 8 | 21.336 | 4.190 | 1.84666 | 23.8 |

TABLE 7-continued

SURFACE DATA

| Surf. No. | r | d | N(d) | vd |
|---|---|---|---|---|
| 9 | 182.135 | 4.215 | | |
| 10 | −34.291 | 1.100 | 1.77250 | 49.6 |
| 11 | −102.839 | d11 | | |
| 12(Diaphragm) | ∞ | 1.500 | | |
| 13 | 22.972 | 2.825 | 1.48749 | 70.2 |
| 14 | −35.076 | 3.799 | | |
| 15 | 33.319 | 5.000 | 1.48749 | 70.2 |
| 16 | −15.587 | 1.000 | 1.84500 | 40.9 |
| 17 | 135.438 | d17 | | |
| 18* | −25.500 | 5.314 | 1.48749 | 70.4 |
| 19 | −11.278 | 1.200 | 1.80500 | 25.4 |
| 20 | −13.128 | — | | |

The asterisk (*) designates an aspherical surface which is rotationally symmetrical with respect to the optical axis.

TABLE 8

ZOOM LENS SYSTEM DATA
Zoom Ratio: 3.67

| | Short Focal Length Extremity | Intermediate Focal Length | Long Focal Length Extremity |
|---|---|---|---|
| FNO. | 4.1 | 4.9 | 6.1 |
| f | 18.50 | 34.99 | 67.98 |
| W | 38.8 | 21.8 | 11.6 |
| Y | 14.24 | 14.24 | 14.24 |
| fB | 39.41 | 57.40 | 79.43 |
| L | 125.50 | 142.91 | 178.79 |
| d3 | 2.500 | 22.814 | 46.632 |
| d11 | 25.242 | 10.177 | 2.000 |
| d17 | 10.581 | 4.746 | 2.955 |

TABLE 9

Aspherical Surface Data

| Surf. No. | K | A4 | A6 | A8 |
|---|---|---|---|---|
| 4 | 0.000 | 0.1691E−04 | −0.2846E−07 | 0.2941E−10 |
| 18 | 0.000 | −0.7344E−04 | −0.2429E−06 | −0.1843E−08 |

TABLE 10

LENS GROUP DATA

| Lens Group | 1$^{st}$ Surf. | Focal Length |
|---|---|---|
| 1 | 1 | 158.83 |
| Sub-1(2) | 4 | −29.92 |
| Sub-2(2) | 10 | −67.07 |
| 3 | 13 | 36.77 |
| 4 | 18 | 54.59 |

Numerical Embodiment 4

FIGS. 19 through 24D and Tables 11 through 14 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20O and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows a lens arrangement of the fourth numerical embodiment of the zoom lens system at the short focal length extremity when focused on an object at infinity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 11 shows the lens surface data, Table 12 shows various data of the zoom lens system, Table 13 shows the aspherical surface data, and Table 14 shows various data of the lens groups of the fourth numerical embodiment of the zoom lens system according to the present invention.

The fundamental lens arrangement of the fourth numerical embodiment is the same as that of the first numerical embodiment, except for the following aspects:

(1) The first sub-lens group G2a is configured of a negative meniscus lens element 21 having a convex surface on the object side, a biconcave negative lens element 22, and a biconvex positive lens element 23, in that order from the object side. The negative meniscus lens element 21 is a hybrid lens having an aspherical layer, formed from a compound resin material, adhered to the object side thereof.

(2) The negative single lens element 24 of the second sub-lens group G2b is a negative meniscus lens element having a convex surface on the image side.

(3) The rearward-remaining lens group is configured of a positive third lens group G3, a negative fourth lens group G4N, and a positive fifth lens group G5, in that order from the object side.

(4) The third lens group G3 is configured of a positive meniscus lens element 31' having a convex surface on the object side, a cemented lens formed from a negative meniscus lens element 32' having a convex surface on the object side and a biconvex positive lens element 33'; and a biconvex positive lens element 34', in that order from the object side. The positive meniscus lens element 31' and the biconvex positive lens element 34' are each provided with an aspherical surface on the object side thereof.

(5) The fourth lens group G4N is configured of a cemented lens formed from a positive meniscus lens element 41' having a convex surface on the image side, and a biconcave negative lens element 42', in that order from the object side.

(6) The fifth lens group G5 is configured of a biconvex positive lens element 51, and a cemented lens formed from a biconvex positive lens element 52 and a negative meniscus lens element 53 having a convex surface on the image side, in that order from the object side. The biconvex positive lens element 51 has an aspherical surface on the image side thereof.

(7) The optical filter OP and the cover glass CG are not provided.

TABLE 11

SURFACE DATA

| Surf. No. | r | d | N(d) | vd |
|---|---|---|---|---|
| 1 | 681.184 | 1.800 | 1.84666 | 23.8 |
| 2 | 123.356 | 4.977 | 1.69680 | 55.5 |
| 3 | −1150.833 | 0.100 | | |
| 4 | 57.158 | 3.702 | 1.72916 | 54.7 |
| 5 | 129.446 | d5 | | |
| 6* | 62.744 | 0.080 | 1.52700 | 43.7 |
| 7 | 49.960 | 1.200 | 1.88300 | 40.8 |
| 8 | 14.000 | 6.951 | | |
| 9 | −34.033 | 1.200 | 1.83481 | 42.7 |
| 10 | 27.582 | 0.201 | | |
| 11 | 25.564 | 7.335 | 1.64524 | 33.5 |
| 12 | −21.922 | 2.373 | | |
| 13 | −24.993 | 1.000 | 1.80061 | 47.0 |
| 14 | −154.434 | d14 | | |
| 15(Diaphragm) | ∞ | 0.007 | | |
| 16 | 68.863 | 1.159 | 1.49700 | 81.6 |
| 17 | 84.777 | 0.104 | | |
| 18 | 26.154 | 1.000 | 1.84699 | 23.8 |
| 19 | 18.248 | 6.939 | 1.48749 | 70.2 |
| 20 | −105.820 | 0.148 | | |
| 21* | 33.129 | 4.871 | 1.59198 | 40.9 |
| 22 | −53.420 | d22 | | |
| 23 | −47.539 | 3.460 | 1.84700 | 23.8 |
| 24 | −16.082 | 1.000 | 1.80241 | 46.6 |
| 25 | 42.956 | d25 | | |
| 26 | 83.795 | 5.074 | 1.49700 | 81.6 |
| 27* | −24.969 | 0.100 | | |
| 28 | 82.991 | 6.933 | 1.49700 | 81.6 |
| 29 | −18.080 | 1.100 | 1.84699 | 25.4 |
| 30 | −57.049 | — | | |

The asterisk (*) designates an aspherical surface which is rotationally symmetrical with respect to the optical axis.

TABLE 12

ZOOM LENS SYSTEM DATA
Zoom Ratio: 4.12

| | Short Focal Length Extremity | Intermediate Focal Length | Long Focal Length Extremity |
|---|---|---|---|
| FNO. | 4.1 | 4.1 | 4.1 |
| f | 16.48 | 34.99 | 67.90 |
| W | 42.0 | 22.1 | 11.6 |
| Y | 14.24 | 14.24 | 14.24 |
| fB | 43.03 | 59.31 | 70.66 |
| L | 144.79 | 154.03 | 192.17 |
| d5 | 3.100 | 6.588 | 36.002 |
| d14 | 15.250 | 4.713 | 2.100 |
| d22 | 2.350 | 13.393 | 18.419 |
| d25 | 18.250 | 7.207 | 2.180 |

TABLE 13

Aspherical Surface Data

| Surf. No. | K | A4 | A6 | A8 | A10 |
|---|---|---|---|---|---|
| 6 | 0.000 | 0.2044E−04 | −0.7446E−07 | 0.2799E−09 | −0.6811E−12 |
| 21 | 0.000 | −0.1280E−04 | 0.3282E−09 | | |
| 27 | 0.000 | −0.1422E−05 | 0.4702E−08 | −0.7839E−10 | |

TABLE 14

LENS GROUP DATA

| Lens Group | 1st Surf. | Focal Length |
|---|---|---|
| 1 | 1 | 126.43 |
| Sub-1(2) | 6 | −30.07 |
| Sub-2(2) | 13 | −37.37 |
| 3 | 16 | 22.93 |
| 4 | 23 | −29.06 |
| 5 | 26 | 36.50 |

Numerical Embodiment 5

FIGS. 25 through 30D and Tables 15 through 17 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIGS. 27A, 27B, and 27C show lateral aberrations that occurred in the lens arrangement shown in FIG. 25. FIG. 28 shows a lens arrangement of the fifth numerical embodiment of the zoom lens system at the short focal length extremity when focused on an object at infinity. FIGS. 29A, 29B, 29C and 29D show various aberrations that occurred in the lens arrangement shown in FIG. 28. FIGS. 30A, 30B, and 30C show lateral aberrations that occurred in the lens arrangement shown in FIG. 28. Table 15 shows the lens surface data, Table 16 shows various data of the zoom lens system, and Table 17 shows various data of the lens groups of the fifth numerical embodiment of the zoom lens system according to the present invention.

The fundamental lens arrangement of the fifth numerical embodiment is the same as that of the first numerical embodiment, except for the following aspects:

(1) The negative lens element 21 of the first sub-lens group G2a is a negative meniscus lens element having a convex surface on the object side.

(2) The second sub-lens group G2b is a cemented lens formed from a biconcave negative lens element 24 and a biconvex positive lens element 25, in that order from the object side.

(3) The rearward-remaining lens group is configured of a positive third lens group G3, a negative fourth lens group G4N, a positive fifth lens group G5, and a negative sixth lens group G6, in that order from the object side.

(4) The third lens group G3 is configured of a biconvex positive lens element 31", and a cemented lens formed from a biconvex positive lens element 32" and a negative meniscus lens element 33" having a convex surface on the image side, in that order from the object side.

(5) The fourth lens group G4N is configured of a biconcave negative lens element 41" and a positive meniscus lens element 42" having a convex surface on the object side, in that order from the object side.

(6) The fifth lens group G5 is configured of a biconvex positive lens element 51', a biconvex positive lens element 52', and a cemented lens formed from a biconvex positive lens element 53' and a biconcave negative lens element 54', in that order from the object side.

(7) The sixth lens group G6 is configured of a biconcave negative lens element 61, a biconcave negative lens element 62, and a biconvex positive lens element 63, in that order from the object side.

(8) The optical filter OP and the cover glass CG are not provided.

TABLE 15

SURFACE DATA

| Surf. No. | r | d | N(d) | vd |
|---|---|---|---|---|
| 1 | 118.988 | 2.000 | 1.83500 | 41.9 |
| 2 | 57.018 | 11.722 | 1.43875 | 95.0 |
| 3 | −597.649 | 0.150 | | |
| 4 | 54.077 | 9.256 | 1.48750 | 70.3 |
| 5 | 531.951 | d5 | | |
| 6 | 82.372 | 1.300 | 1.83400 | 37.2 |
| 7 | 24.382 | 4.224 | | |
| 8 | 242.052 | 1.300 | 1.83099 | 43.1 |
| 9 | 16.678 | 6.345 | 1.72790 | 27.7 |
| 10 | 122.684 | 9.963 | | |
| 11 | −29.970 | 1.100 | 1.79211 | 47.5 |
| 12 | 33.873 | 3.422 | 1.80518 | 25.4 |
| 13 | −126.962 | d13 | | |
| 14(Diaphragm) | ∞ | 1.000 | | |
| 15 | 40.154 | 4.265 | 1.59922 | 66.1 |
| 16 | −47.572 | 0.100 | | |
| 17 | 41.055 | 5.179 | 1.48749 | 70.2 |
| 18 | −27.672 | 1.100 | 1.80518 | 25.4 |
| 19 | −218.183 | d19 | | |
| 20 | −44.940 | 1.200 | 1.71300 | 53.9 |
| 21 | 18.383 | 3.371 | 1.78472 | 25.7 |
| 22 | 74.758 | d22 | | |
| 23 | 304.063 | 3.691 | 1.48749 | 70.2 |
| 24 | −28.063 | 0.100 | | |
| 25 | 78.753 | 2.782 | 1.61800 | 63.4 |
| 26 | −94.797 | 0.100 | | |
| 27 | 32.357 | 5.113 | 1.49700 | 81.6 |
| 28 | −25.875 | 1.200 | 1.80105 | 31.4 |
| 29 | 137.934 | d29 | | |
| 30 | −162.978 | 1.200 | 1.80610 | 33.3 |
| 31 | 38.842 | 5.242 | | |
| 32 | −367.568 | 1.200 | 1.77250 | 49.6 |
| 33 | 30.949 | 0.100 | | |
| 34 | 30.539 | 2.935 | 1.80266 | 25.3 |
| 35 | −224.458 | — | | |

TABLE 16

ZOOM LENS SYSTEM DATA
Zoom Ratio: 13.23

| | Short Focal Length Extremity | Intermediate Focal Length | Long Focal Length Extremity |
|---|---|---|---|
| FNO. | 3.6 | 6.1 | 6.0 |
| f | 25.70 | 99.99 | 339.90 |
| W | 29.9 | 8.0 | 2.4 |
| Y | 14.24 | 14.24 | 14.24 |
| fB | 38.00 | 51.10 | 69.25 |
| L | 180.00 | 207.35 | 245.36 |
| d5 | 2.000 | 29.355 | 67.365 |
| d13 | 33.533 | 6.282 | 2.000 |
| d19 | 2.047 | 8.248 | 10.834 |
| d22 | 10.915 | 4.713 | 2.127 |
| d29 | 2.847 | 16.991 | 3.131 |

TABLE 17

LENS GROUP DATA

| Lens Group | 1st Surf. | Focal Length |
|---|---|---|
| 1 | 1 | 111.95 |
| Sub-1(2) | 6 | −29.34 |
| Sub-2(2) | 11 | −51.87 |
| 3(3) | 15 | 31.34 |
| 4(4) | 20 | −43.92 |

TABLE 17-continued

LENS GROUP DATA

| Lens Group | 1st Surf. | Focal Length |
|---|---|---|
| 5(5) | 23 | 29.58 |
| 6(6) | 30 | −45.11 |

Numerical Embodiment 6

Figure 31:
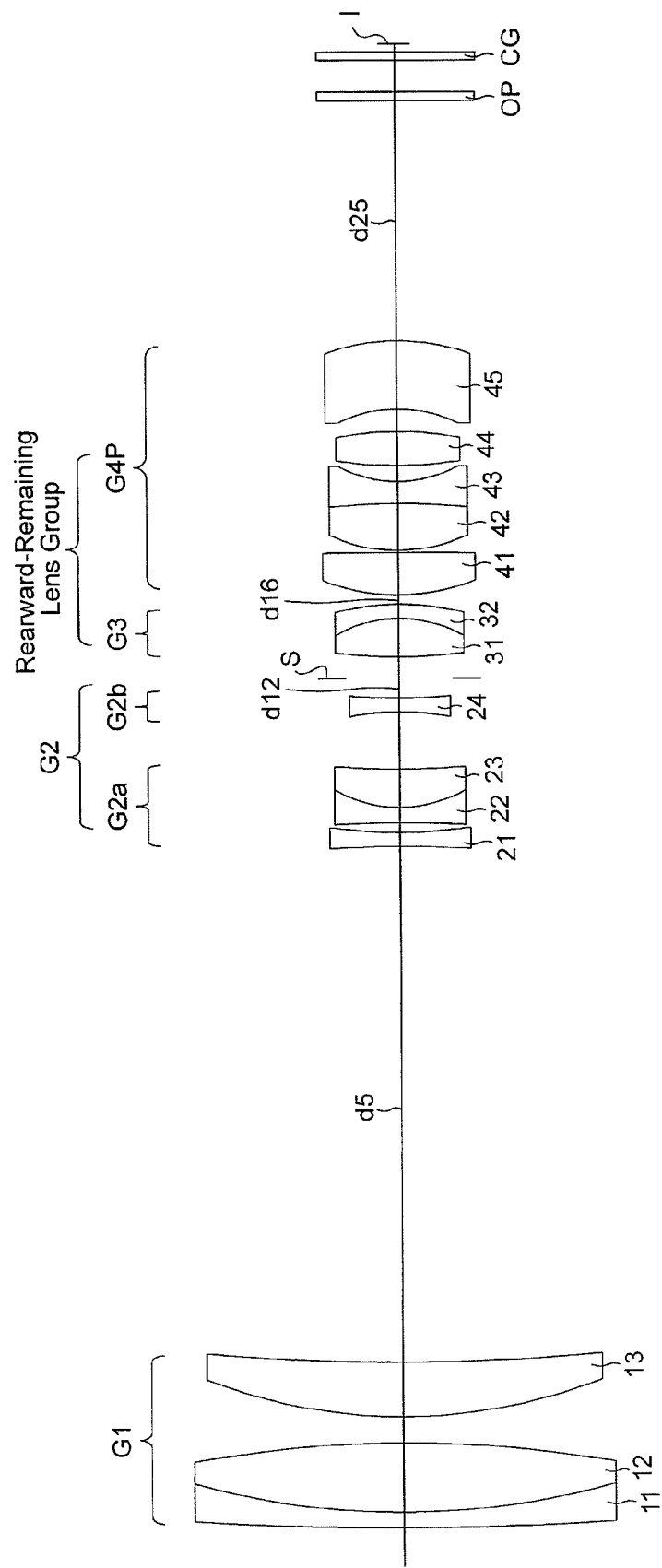
FIG. 31 shows a lens arrangement of a sixth numerical embodiment of a zoom lens system, according to the present invention, at the long focal length extremity when focused on an object at infinity.
Figures 32A, 32B, 32C, 32D:
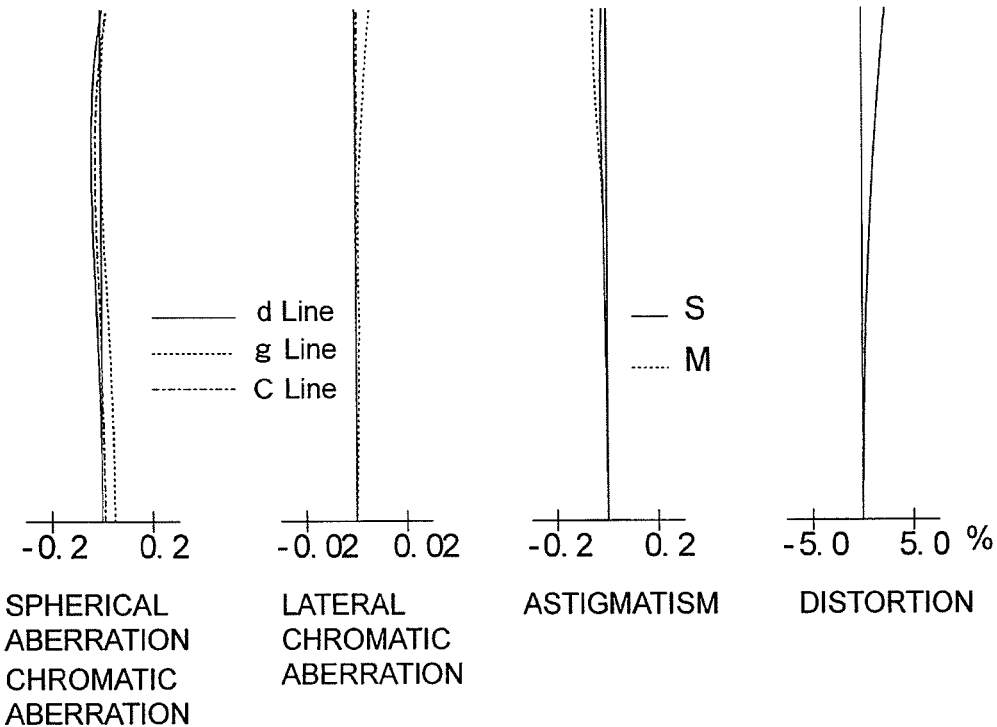
FIGS. 32A, 32B, 32C and 32D show various aberrations that occurred in the lens arrangement shown in FIG. 31.
Figure 33A:
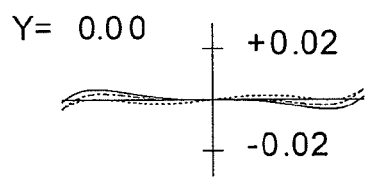
FIGS. 33A, 33B, 33C and 33D show various lateral aberrations that occurred in the lens arrangement shown in FIG. 31.
Figure 33B:
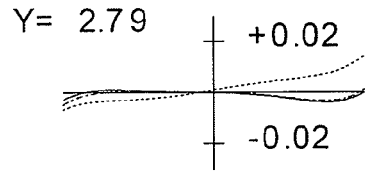
Figure 33C:
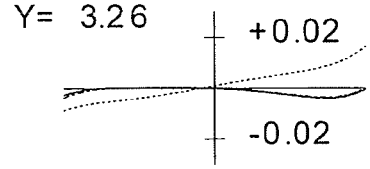
Figure 33D:
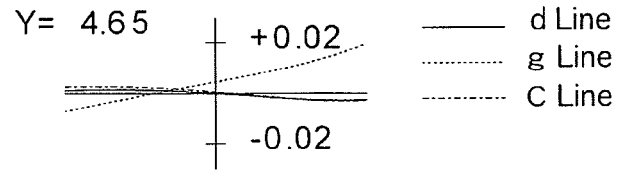
Figure 34:
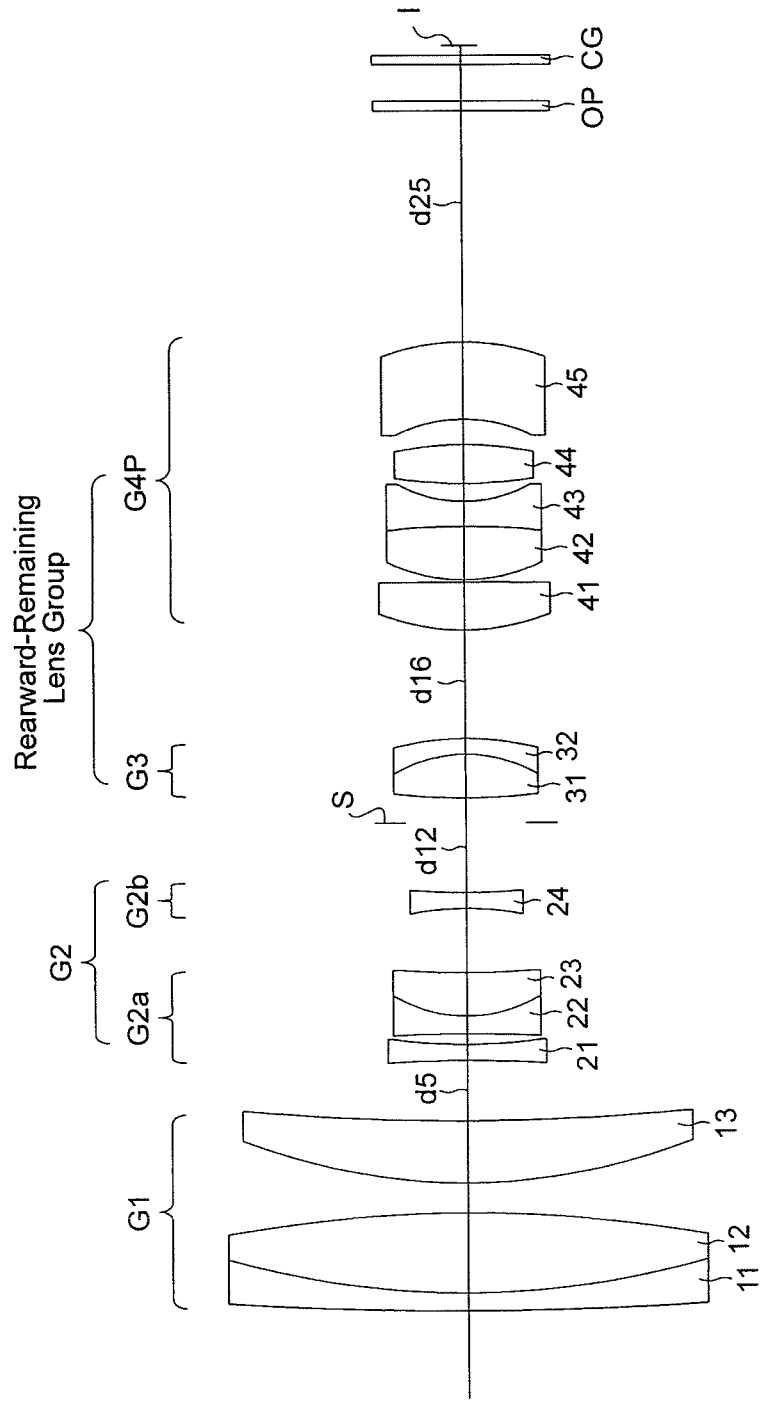
FIG. 34 shows a lens arrangement of the sixth numerical embodiment of the zoom lens system, according to the present invention, at the short focal length extremity when focused on an object at infinity.

FIGS. 31 through 36D and Tables 18 through 20 show a sixth numerical embodiment of a zoom lens system according to the present invention. FIG. 31 shows a lens arrangement of the sixth numerical embodiment of the zoom lens system at the long focal length extremity when focused on an object at infinity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows a lens arrangement of the sixth numerical embodiment of the zoom lens system at the short focal length extremity when focused on an object at infinity. FIGS. 35A, 35B, 35C and 35D show various aberrations that occurred in the lens arrangement shown in FIG. 34. FIGS. 36A, 36B, 36C and 36D show lateral aberrations that occurred in the lens arrangement shown in FIG. 34. Table 18 shows the lens surface data, Table 19 shows various data of the zoom lens system, and Table 20 shows various data of the lens groups of the sixth numerical embodiment of the zoom lens system according to the present invention.

The fundamental lens arrangement of the sixth numerical embodiment is the same as that of the second numerical embodiment, except for the following aspect:

(1) The negative lens element 22 of the first sub-lens group G2a is a biconcave negative lens element.

TABLE 18

SURFACE DATA

| Surf. No. | r | d | N(d) | νd |
|---|---|---|---|---|
| 1 | 222.552 | 1.000 | 1.83400 | 37.3 |
| 2 | 51.255 | 4.465 | 1.49700 | 81.6 |
| 3 | −78.678 | 1.682 | | |
| 4 | 35.854 | 3.480 | 1.49700 | 81.6 |
| 5 | 137.718 | d5 | | |
| 6 | −73.922 | 0.900 | 1.72916 | 54.7 |
| 7 | 32.989 | 0.601 | | |
| 8 | −91.589 | 1.000 | 1.65132 | 57.7 |
| 9 | 8.630 | 2.431 | 1.84533 | 29.4 |
| 10 | 50.943 | 3.644 | | |
| 11 | −18.067 | 0.900 | 1.70025 | 55.4 |
| 12 | 39.329 | d12 | | |
| 13(Diaphragm) | ∞ | 1.400 | | |
| 14 | 37.781 | 2.457 | 1.48759 | 70.3 |
| 15 | −8.412 | 0.900 | 1.80463 | 45.2 |
| 16 | −16.728 | d16 | | |
| 17 | 13.683 | 2.714 | 1.77200 | 49.7 |
| 18 | −303.835 | 0.120 | | |
| 19 | 10.757 | 3.008 | 1.49700 | 81.6 |
| 20 | −43.872 | 1.400 | 1.80500 | 34.7 |
| 21 | 8.197 | 1.017 | | |
| 22 | 27.395 | 2.195 | 1.83391 | 42.1 |
| 23 | −20.136 | 1.434 | | |
| 24 | −9.233 | 4.371 | 1.84700 | 23.8 |
| 25 | −14.029 | d25 | | |
| 26 | ∞ | 0.550 | 1.51633 | 64.1 |
| 27 | ∞ | 2.020 | | |
| 28 | ∞ | 0.500 | 1.51633 | 64.1 |
| 29 | ∞ | — | | |

TABLE 19

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.2 | 3.4 |
| f | 15.30 | 26.00 | 44.10 |
| W | 19.0 | 10.9 | 6.3 |
| Y | 4.65 | 4.65 | 4.65 |
| fB | 0.53 | 0.53 | 0.53 |
| L | 71.12 | 84.38 | 94.85 |
| d5 | 3.400 | 19.692 | 33.068 |
| d12 | 3.919 | 2.729 | 1.250 |
| d16 | 6.112 | 2.484 | 0.600 |
| d25 | 12.970 | 14.754 | 15.215 |

TABLE 20

LENS GROUP DATA

| Lens Group | 1st Surf. | Focal Length |
|---|---|---|
| 1 | 1 | 71.71 |
| Sub-1(2) | 6 | −29.82 |
| Sub-2(2) | 11 | −17.57 |
| 3 | 14 | 42.25 |
| 4 | 17 | 17.97 |

The numerical values of each condition for each embodiment are shown in Table 21.

TABLE 21

| | Embod. 1 | Embod. 2 | Embod. 3 |
|---|---|---|---|
| Cond. (1) | 0.379 | 0.466 | 0.259 |
| Cond. (2) | 65.29 | 55.69 | 49.60 |
| Cond. (3) | 1.600 | 1.700 | 1.773 |
| Cond. (4) | 0.757 | 1.147 | 0.417 |

| | Embod. 4 | Embod. 5 | Embod. 6 |
|---|---|---|---|
| Cond. (1) | 0.324 | 0.304 | 0.560 |
| Cond. (2) | 46.89 | 47.55 | 55.44 |
| Cond. (3) | 1.803 | 1.792 | 1.700 |
| Cond. (4) | 0.805 | 0.566 | 1.697 |

As can be understood from Table 21, the first through sixth embodiments satisfy conditions (1) through (4). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, and a positive rearward-remaining lens group, in that order from the object side, wherein upon zooming from the short focal length extremity to the long focal length extremity, the distance between said first lens group and said second lens group increases, the distance between said second lens group and said rearward-remaining lens group decreases, and at least said first lens group and at least part of said rearward-remaining lens group moves in the optical axis direction of said zoom lens system, wherein said second lens group includes a negative first sub-lens group which does not move in the optical axis direction during a focusing operation, and a negative second sub-lens group which moves in the optical axis direction during a focusing operation, in that order from the object side;

wherein said positive rearward-remaining lens group includes at least two lens groups, the distance therebetween mutually changing during zooming from the short focal length extremity to the long focal length extremity;

wherein said second sub-lens group comprises a single lens element; and wherein the distance between said first sub-lens group and said second sub-lens group remains constant during zooming from the short focal length extremity to the long focal length extremity.

2. The zoom lens system according to claim 1, wherein the following condition (1) is satisfied:

$$0.1 < f2/f2b < 0.7 \quad (1),$$

wherein
f2 designates the focal length of said second lens group, and
f2b designates the focal length of said second sub-lens group.

3. The zoom lens system according to claim 1, wherein the following condition (2) is satisfied:

$$45 < \nu 2bn \quad (2),$$

wherein
ν2bn designates the Abbe number with respect to the d-line of the negative lens element of said second sub-lens group.

4. The zoom lens system according to claim 1, wherein the following condition (3) is satisfied:

$$1.55 < N2bn \quad (3),$$

wherein
N2bn designates the refractive index at the d-line of the negative lens element of said second sub-lens group.

5. The zoom lens system according to claim 1, wherein the following condition (4) is satisfied:

$$0.2 < f2a/f2b < 2.0 \quad (4),$$

wherein
f2a designates the focal length of the first sub-lens group, and
f2b designates the focal length of the second sub-lens group.

6. The zoom lens system according to claim 1, wherein said rearward-remaining lens group comprises a positive third lens group, and a positive fourth lens group, in that order from the object side.

7. The zoom lens system according to claim 1, wherein said rearward-remaining lens group comprises a positive third lens group, a negative fourth lens group, and a positive fifth lens group, in that order from the object side.

8. The zoom lens system according to claim 1, wherein said rearward-remaining lens group comprises a positive third lens group, a negative fourth lens group, a positive fifth lens group, and a negative sixth lens group, in that order from the object side.

9. An electronic imaging apparatus comprising said zoom lens system according to claim 1.

10. The zoom lens system according to claim 1, wherein said rearward-remaining lens group comprises a positive third lens group, and a positive fourth lens group, in that order from the object side.

11. A zoom lens system comprising a positive first lens group, a negative second lens group, and a positive rearward-remaining lens group, in that order from the object side, wherein upon zooming from the short focal length extremity to the long focal length extremity, the distance between said first lens group and said second lens group increases, the distance between said second lens group and said rearward-remaining lens group decreases, and at least said first lens group and at least part of said rearward-remaining lens group moves in the optical axis direction of said zoom lens system, wherein said second lens group includes a negative first sub-lens group which does not move in the optical axis direction during a focusing operation, and a negative second sub-lens group which moves in the optical axis direction during a focusing operation, in that order from the object side;

wherein said positive rearward-remaining lens group includes at least two lens groups, the distance therebetween mutually changing during zooming from the short focal length extremity to the long focal length extremity;

wherein said second sub-lens group comprises a cemented lens formed from a negative lens element and a positive lens element, in that order from the object side; and wherein the distance between said first sub-lens group and said second sub-lens group remains constant during zooming from the short focal length extremity to the long focal length extremity.

12. The zoom lens system according to claim 11, wherein the following condition (1) is satisfied:

$$0.1 < f2/f2b < 0.7 \quad (1),$$

wherein
f2 designates the focal length of said second lens group, and
f2b designates the focal length of said second sub-lens group.

13. The zoom lens system according to claim 11, wherein the following condition (2) is satisfied:

$$45 < \nu 2bn \quad (2),$$

wherein
ν2bn designates the Abbe number with respect to the d-line of the negative lens element of said second sub-lens group.

14. The zoom lens system according to claim 11, wherein the following condition (3) is satisfied:

$$1.55 < N2bn \quad (3),$$

wherein
N2bn designates the refractive index at the d-line of the negative lens element of said second sub-lens group.

15. The zoom lens system according to claim 11, wherein the following condition (4) is satisfied:

$$0.2 < f2a/f2b < 2.0 \quad (4),$$

wherein
f2a designates the focal length of the first sub-lens group, and
f2b designates the focal length of the second sub-lens group.

16. The zoom lens system according to claim 11, wherein said rearward-remaining lens group comprises a positive third lens group, a negative fourth lens group, and a positive fifth lens group, in that order from the object side.

17. The zoom lens system according to claim 11, wherein said rearward-remaining lens group comprises a positive third lens group, a negative fourth lens group, a positive fifth lens group, and a negative sixth lens group, in that order from the object side.

* * * * *